(12) United States Patent
Nitsuma

(10) Patent No.: US 8,708,409 B2
(45) Date of Patent: Apr. 29, 2014

(54) VEHICLE SEAT

(75) Inventor: Kenichi Nitsuma, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 322 days.

(21) Appl. No.: 13/145,218

(22) PCT Filed: Jan. 21, 2010

(86) PCT No.: PCT/JP2010/050706
§ 371 (c)(1),
(2), (4) Date: Jul. 19, 2011

(87) PCT Pub. No.: WO2010/084911
PCT Pub. Date: Jul. 29, 2010

(65) Prior Publication Data
US 2011/0272978 A1  Nov. 10, 2011

(30) Foreign Application Priority Data

Jan. 21, 2009 (JP) ................................. 2009-011460
Jan. 28, 2009 (JP) ................................. 2009-017396
Feb. 4, 2009 (JP) ................................. 2009-024348

(51) Int. Cl.
*B60N 2/42* (2006.01)

(52) U.S. Cl.
USPC ............. 297/216.14; 297/216.12; 297/216.13

(58) Field of Classification Search
USPC ................. 297/284.4, 216.1, 216.13, 216.12, 297/216.14
See application file for complete search history.

(56) References Cited

U.S. PATENT DOCUMENTS

| 7,575,278 | B2 * | 8/2009 | Wissner et al. | 297/284.4 |
| 8,235,467 | B2 * | 8/2012 | Akutsu | 297/284.4 |
| 8,419,126 | B2 * | 4/2013 | Nitsuma | 297/216.13 |
| 8,544,948 | B2 * | 10/2013 | Nitsuma | 297/216.14 |
| 8,550,552 | B2 * | 10/2013 | Nitsuma | 297/216.14 |
| 2005/0040686 | A1 | 2/2005 | Van-Thournout et al. | |
| 2006/0232114 | A1 | 10/2006 | Sugiyama et al. | |
| 2009/0062989 | A1 * | 3/2009 | Sakai et al. | 701/45 |
| 2010/0176630 | A1 | 7/2010 | Nitsuma | |

FOREIGN PATENT DOCUMENTS

| JP | 2000-272395 A | 10/2000 |
| JP | 2003-341402 A | 12/2003 |
| JP | 2004-016708 A | 1/2004 |
| JP | 2004-209017 A | 7/2004 |
| JP | 2005-022473 A | 1/2005 |
| JP | 2005-028956 A | 2/2005 |
| JP | 2005-510399 A | 4/2005 |

(Continued)

OTHER PUBLICATIONS

Office Action established for JP 2009-017396 (Sep. 24, 2013).

*Primary Examiner* — Philip Gabler
(74) *Attorney, Agent, or Firm* — Drinker Biddle & Reath LLP

(57) ABSTRACT

A vehicle seat is provided that includes a seat back frame, a headrest, a pressure receiving member that moves independently from the headrest, and pivoting members that are disposed in at least one of both side portions of the seat back frame, are linked to the pressure receiving member, and move independently from the headrest under a predetermined impact load. The pivoting members are linked via coupling members to a biasing element that biases the pressure receiving member toward the front of the seat back frame. The force that restores the pivoting members into an initial state is greatest during normal seating, and covers a range in which the force decreases when the pivoting members move due to a rear-end collision.

20 Claims, 15 Drawing Sheets

(56) References Cited

FOREIGN PATENT DOCUMENTS

| | | |
|---|---|---|
| JP | 2005-177227 A | 7/2005 |
| JP | 2006-020733 A | 1/2006 |
| JP | 2007-062523 A | 3/2007 |
| WO | WO 2006/126450 A1 | 11/2006 |
| WO | WO 2009/011388 A1 | 1/2009 |

* cited by examiner

VEHICLE SEAT

CROSS REFERENCE TO RELATED APPLICATIONS

This application is the U.S. national phase of the International Patent Application No. PCT/JP2010/050706, filed Jan. 21, 2010, which claims the benefit of Japanese Patent Application No. 2009-011460, filed Jan. 21, 2009, Japanese Patent Application No. 2009-017396, filed Jan. 28, 2009, and Japanese Patent Application No. 2009-024348, filed Feb. 4, 2009, the entire content of all being incorporated herein by reference.

BACKGROUND

The present invention relates to vehicle seats, and particularly relates to vehicle seats to reduce the impact at the time of a rear-end collision.

In general, when a vehicle such as an automobile experiences a rear-end collision by being rear-ended, a large impact when traveling in reverse, or the like, there is a risk that the head region of an occupant sitting in a seat in the vehicle will snap backwards suddenly due to inertia force, resulting in an impact on the neck region.

For this reason, vehicle seats in automobiles and the like have conventionally included headrests in the upper area of the seat backs that support the heads of occupants from behind in order to protect the head regions, neck regions, and the like, of occupants from impacts caused by rear-end collisions, thereby reducing impact on the neck regions of the occupants.

However, simply providing a headrest cannot reduce impacts on the body, and furthermore, if the gap between the head region of the occupant and the headrest cannot quickly be reduced at the time of a rear-end collision, there may be the cases where the impact upon the neck region cannot sufficiently be reduced.

In order to solve this problem, a technique in which the headrest is caused to move forward at the time of a rear-end collision due to the backward moving load of the occupant, thus supporting the head region of the occupant and reducing the impact on the neck region, has been proposed (for example, see Japanese Patent Application Publication No. 2003-341402 ("the '402 Publication")).

In addition, a technique in which, in a vehicle seat provided with a seat back that supports a seat back cushion using a seat back frame, the area of the seat back that makes contact with the back of the occupant at the time of a rear-end collision has a lower spring coefficient and a higher damping coefficient than those of the other areas, is known (for example, see Japanese Patent Application Publication No. 2005-028956 ("the '956 Publication")).

Furthermore, a vehicle seat has been proposed in which, in a backrest that includes a headrest, a mobile frame having a spring member that supports a cushion member is attached to a fixed frame on the top of which the headrest is mounted so that the upper portion of the mobile frame rotates backward along the lower portion of the mobile frame; furthermore, a spring that supports a normal seating load but allows the mobile frame to move backward when an impact load greater than or equal to a predetermined load is exerted thereon is provided between the fixed frame and the mobile frame (for example, see Japanese Patent Application Publication No. 2000-272395 ("the '395 Publication")).

Further, a technique that moves a headrest to a support position corresponding to a predicted rear-end collision by a continuous adjustable positioning system for adjusting the position of a headrest continuously is known (for example, see Japanese Patent Application Publication No. 2005-177227 ("the '227 Publication")).

Although both of the techniques disclosed in the '402 and '956 Publications soften the impact on an occupant, the technique disclosed in the '402 Publication receives the backward movement of the chest area of the occupant with a pressure receiving member at the time of a rear-end collision, and causes the headrest to move forward along with the backward movement of the pressure receiving member. With such a technique, it is necessary to provide a separate movement mechanism for the headrest in order to allow the tandem movement with the headrest, which complicates the mechanism and increases the cost thereof. Furthermore, because it is necessary to provide a mobile portion in the seat back frame in order to move the headrest, it is also necessary to prevent a resulting rigidity degradation of the structure. Therefore, an increased rigidity beyond what is normally required is necessary.

The technique disclosed in the '956 Publication increases the backward movement of the upper body and decreases the relative amount of movement between the head region and the back region by reducing the spring coefficient of the area that makes contact with the back region of the seat back (the "chest region" in the '956 Publication), and, by increasing the damping coefficient by way of a cushion of low rebound resilience, reduces the shearing force that acts on the neck region by suppressing rebounding of the upper body and reducing the relative speed between the head region and the back region.

However, with a technique that reduces the spring coefficient, a technique that employs a cushion of low rebound resilience, or the like, there has been a problem in that the amount by which the body sinks toward the back of the vehicle (in other words, the amount of movement) cannot be increased.

Furthermore, the technique disclosed in the '395 Publication simply sets the elastic force of the spring relative to the impact load, and thus the operational load at which a central support portion moves backward can reliably be predicted, ensuring that that portion moves backward without fail. This technique thus has an advantage of ensured operations.

However, with the technique disclosed in the '395 Publication, the fixed frame and the mobile frame are fixed at their lower portions using an attachment shaft, and thus there is a quite small movement of the mobile frame allowed relative to the fixed frame in the vicinity of the lower areas thereof. So, there is a problem in that the entire body of a seated occupant cannot be caused to sink toward the back of the vehicle. Furthermore, the spring disclosed in the '395 Publication experiences a reaction force increase along with an increase of the amount of movement, which disturbs the movement. Furthermore, the range of mobility between the fixed frame and the mobile frame is extremely limited, and there has thus been a problem in that it is difficult to ensure a movement amount that allows a high degree of sinking. Furthermore, because the mobile frame is used, the overall size of the apparatus increases and achieving a lighter weight is difficult.

In addition, with the technique that moves the headrest by attaching the pressure receiving member to the seat frame with a wire, because the posture of the occupant is held by the pressure receiving member and because the headrest is moved by way of loads exerted on the pressure receiving member, it is necessary to prevent deformation of the wire serving as the coupling member to the greatest extent possible. However, because the wire does not deform, the amount of sinking is reduced and this makes it difficult to increase the amount of movement while achieving a balance with seating comfort.

The technique disclosed in the '227 Publication makes it possible to move the headrest to a support position in accordance with a predicted rear impact, which is effective in preventing whiplash injuries. Furthermore, the mechanism, which includes a motor, is provided within the headrest and thus the elements that need to be provided within the vehicle seat itself can be minimized.

However, if the expected functions against a rear impact are to be attained using a single neck region impact reduction apparatus, such as an active headrest unit, it is necessary to increase the amount of movement of the headrest. However, if the amount of movement of the headrest is increased and the headrest is moved by the increased amount to a head region receiving position in a short amount of time, there may be a problem that a sense of discomfort will be imparted upon the occupant, depending on the position of the head region of that occupant.

Furthermore, there is a problem in that, if an attempt is made to increase the amount of movement, it is necessary to provide a corresponding mechanism in the headrest, which leads to an increase in the weight thereof.

Thus, what is needed is a technique that can reduce the amount of movement of the headrest, move the headrest with a small apparatus, and realize a more highly-safe impact reduction function against rear impacts in a highly-responsive and reliable manner.

It is an object herein to provide a vehicle seat that, using a simple configuration that is independent from a headrest, can increase the amount of sinking (movement) of the entire body of a seated occupant toward the rear of the vehicle at the time of a rear-end collision, and can reduce the impact on the occupant at the time of a rear-end collision.

It is another object herein to provide a vehicle seat that suppresses malfunction of an impact reduction member because of the impact reduction member that does not easily move during normal seating, while also ensuring smooth movement of the impact reduction member after the movement at the time of a rear-end collision.

It is yet another object herein to provide a vehicle seat that effectively reduces impacts on the body, the neck region, and the like, of an occupant at the time of a rear-end collision, using a configuration that does not require rigidity beyond what is normally required, with a lower number of components, a small size, a light weight, a simple structure, and a low cost.

It is yet another object herein to provide a vehicle seat that effectively provides rigid side portions with impact reduction members that move independently from headrests in order to reduce the impact on the neck region and the like of an occupant at the time of a rear-end collision, and that prevents interference with other members that are provided.

Furthermore, it is yet another object herein to provide a more highly-safe vehicle seat that reduces the size of a neck region impact reduction apparatus at the time of rear-end collisions and that reliably realizes an impact reduction function against rear impacts in a highly-responsive and reliable manner.

The problems mentioned above are solved by a vehicle seat including: a seat back frame including at least side portions located on both sides of the seat back frame and an upper portion disposed in an upper area of the seat back frame; a headrest disposed in an upper area of the seat back frame; a pressure receiving member that is linked to the seat back frame via a coupling member and that moves independently from the headrest; and an impact reduction member that is disposed in at least one of the side portions of the seat back frame, is linked to the pressure receiving member, and moves independently from the headrest under a predetermined impact load. The impact reduction member is linked to a biasing element that biases the pressure receiving member toward a front of the seat back frame via the coupling member; and the force that restores the impact reduction member into an initial state is greatest during normal seating, and covers a range in which the force decreases when the impact reduction member moves due to a rear-end collision.

As described above, the force that restores the impact reduction member into the initial state is greatest during normal seating, and thus the impact reduction member does not easily move during normal seating, malfunction of the impact reduction member is suppressed, and the impact reduction member is stabilized. Furthermore, because the force that restores the impact reduction member into the initial state covers a range in which the force decreases when the impact reduction member moves due to a rear-end collision, the impact reduction member smoothly moves at the time of a rear-end collision within that range. This makes it possible to significantly move the pressure receiving member that is linked to the impact reduction member and cause the occupant to sink into the vehicle seat.

Furthermore, because the impact reduction member is linked to the biasing element that biases the pressure receiving member toward the front of the seat back frame via the coupling member and because the pressure receiving member moves independently from the headrest, the impact reduction member can move under a load from the pressure receiving member at the time of a rear-end collision, and thus the head region of the occupant is caused to come into contact with the headrest in a state where the body of the occupant is kept in a seated posture. For this reason, it is possible to reduce impacts on the head region or the neck region by supporting the head region of the occupant, without providing a mechanism linked with the headrest to cause the headrest to move forward.

Furthermore, because the impact reduction member and the pressure receiving member are both independent from the headrest, a mechanism or the like for transmitting loads occurring at the impact reduction member and the pressure receiving member to the headrest is not necessary. This enables a simply designed vehicle seat with a lighter weight.

In an embodiment, the impact reduction member includes a shaft that is rotatable, and for the momentum generated by the biasing element that causes the impact reduction member to rotate to be greatest during normal seating and to cover a range in which the momentum decreases when the impact reduction member rotates due to a rear-end collision.

In this manner, by employing a configuration in which the impact reduction member rotates, at the time of a rear-end collision, the impact reduction member can move smoothly, the pressure receiving member is caused to move significantly, and the occupant can reliably sink significantly. Further, the impact reduction member is configurable in a compact manner.

In an embodiment, the force that restores the impact reduction member into the initial state gradually decreases along with movement or rotation of the impact reduction member.

By doing so, because the force that restores the impact reduction member into the initial state decreases along with movement or rotation of the impact reduction member, the impact reduction member can move or rotate efficiently even when the load transmitted from the pressure receiving member at the time of a rear-end collision becomes small, and thus a sufficient amount of sinking is ensured.

In an embodiment, the impact reduction member is disposed in both of the side portions in the seat back frame, and both of the impact reduction members move or rotate independently from each other.

In this manner, by providing the impact reduction members in both the side portions in the seat back frame, simplicity and a lighter weight is achievable, which is different from the prior art in which the impact reduction member is linked to the headrest.

Furthermore, by employing a configuration in which both impact reduction members move or rotate independently from each other, in the case where an imbalance has occurred in the load, the respective impact reduction members move or rotate independently from each other in the respective side portions in accordance with the load. For this reason, the vehicle seats are settable so that sinking occurs in accordance with the size of the impact load. Further, because the force that restores the impact reduction members into the initial state decreases along movement of the impact reduction members, this configuration is advantageous in that the impact reduction members that are independent from each other can move more smoothly even solely.

In an embodiment, in the case where one end of the biasing element is linked to the seat back frame and the other end of the biasing element is linked to the impact reduction member, and a straight line that connects a position at which the seat back frame and the biasing elements are linked with the position at which the impact reduction member and the biasing elements are linked approaches the shaft, along with rotation of the impact reduction member due to the pulling force of the coupling member occurring due to a load exerted on the pressure receiving member, the position where the engagement portion of the biasing elements or the coupling member is disposed can more freely be selected.

Generally speaking, the pulling load (warp amount) of the biasing element is greatest when a line that connects the shaft with both ends of the biasing element is straight. However, in the case where the tension generated via the coupling member when the impact reduction member begins to rotate and the tension generated until the rotation is stopped (i.e., until the rotation ends) are approximately the same amount, the movement amount of the biasing element (the amount of distance change) decreases approximately when the impact reduction member is rotated by the amount it reaches the point immediately before the above-mentioned point where the load of the biasing element is greatest, i.e., the point where the trajectory traced by the end of the biasing element attached to the impact reduction member is farthest from the other end of the biasing element, and thus a region where the amount change in the pulling load of the biasing element becomes small relative to the movement position or rotational angle is created.

For this reason, the force by which the biasing element causes the impact reduction member to rotate is greatest initially and decreases along with the rotation. This results in a state where the impact reduction member does not easily rotate during normal seating but smoothly moves at the time of a rear-end collision, which is the most preferable.

Furthermore, even in a case where the tension increases due to the position at which the biasing element is disposed, the configuration is such that a straight line that connects the position at which the seat back frame and the biasing elements are linked with the position at which the impact reduction member and the biasing elements are linked approaches the shaft, which increases the region in which the biasing elements and the like are disposed. This increases the choices for the disposal of the biasing elements or the coupling member.

As described above, in the case where a large impact load has occurred due to a rear-end collision or the like, the impact reduction member moves or rotates against the biasing force of the biasing elements, thus moving the coupling member, which in turn causes the pressure receiving member to move in the backward direction, and this makes it possible to cause the occupant to sink toward the rear of the vehicle.

By employing such a configuration, the impact reduction member does not move or rotate in a load range that occurs under a normal seating load, and there is thus no effect on the seating comfort, which makes it possible to maintain favorable seating comfort. Furthermore, the force by which the biasing elements restores the impact reduction member into the initial state against the force that moves or rotates the impact reduction member is greatest initially and decreases along with the movement or rotation. This results in the state where the impact reduction member does not easily rotate during normal seating but moves smoothly at the time of a rear-end collision.

In an embodiment, the seat back frame includes a lower portion disposed in a lower area, and the impact reduction member is disposed within a range enclosed by the seat back frame.

In this manner, because the impact reduction member is disposed within a range enclosed by the seat back frame, the portion of the seat back corresponding to the lower- to mid-back region of the occupant is moved significantly backward when an impact has occurred, without interference with the various elements disposed on the outside of the seat back frame. This makes it possible to cause the occupant to sink to a sufficient extent.

In an embodiment, the impact reduction member is disposed in a range that is below the upper end of the pressure receiving member.

This makes it possible to efficiently transmit the load from the pressure receiving member that supports the body of the occupant to the impact reduction member. Thus, the portion of the seat back corresponding to the lower- to mid-back region of the occupant is moved significantly backward when an impact has occurred, and the occupant is caused to sink to a sufficient extent.

In an embodiment, the seat back frame includes a pipe portion that spans across the side portions and the upper portion, and a reclining mechanism has a rotation shaft, and the impact reduction member is disposed between a lower end of the pipe portion and the rotation shaft of the reclining mechanism.

With this configuration, the impact reduction member can effectively be disposed in the side portions having rigidity, and the impact reduction member is disposed in a position where the amount of sinking is large, so that the load can efficiently be transmitted. Accordingly, the portion of the seat back corresponding to the lower- to mid-back region of the occupant is moved significantly backward when an impact has occurred, and this makes possible to cause the occupant to sink to a sufficient extent.

In an embodiment, the impact reduction member is disposed at a height that is within a range from 50 mm to 270 mm above the hip point. The height range of 50 mm to 270 mm from the hip point is a location in which, taking the body type of the occupant into consideration, the occupant sinks the most at the time of a collision. The load on the impact reduction member is transmitted efficiently in this range, which makes it possible to sink the lower back region to the back region of the occupant into the seat back to a sufficient extent upon receiving an impact.

In an embodiment, a disposal range for an airbag apparatus is formed in the side portions of the seat back frame, and the impact reduction member is disposed between the upper end and the lower end of the disposal range for an airbag apparatus.

With this configuration, interference with other disposed elements is preventable, and the impact reduction member is disposed using the small space more effectively.

In an embodiment, a recess portion is formed in the pressure receiving member in an area that opposes the seat back frame, and the impact reduction member is disposed in a location that opposes the recess portion of the pressure receiving member.

With this configuration, because the recess portion is provided, the impact reduction member is checkable when and after it is assembled and when the skin material is opened.

In an embodiment, the vehicle seat includes a first neck region impact reduction apparatus and a second neck region impact reduction apparatus movable independently from each other; and the configuration is such that the first neck region impact reduction apparatus is an active headrest that moves the headrest forward upon the prediction of a collision or under a predetermined impact load, and the second neck region impact reduction apparatus is the impact reduction member that causes the pressure receiving member to sink toward the back of the seat back frame under a predetermined impact load.

In this manner, two types of neck region impact reduction apparatus, i.e., the active headrest and the impact reduction member are used. Thus, the two neck region impact reduction apparatuses operate independently from each other, in a manner that the headrest moves forward upon the prediction of a collision or under a predetermined impact load and that the impact reduction member causes the pressure receiving member to sink toward the back of the seat back frame under a predetermined impact load. This makes it possible to reduce the amount of operation of the respective apparatuses compared to when the apparatuses are used solely, which in turn improves the response and realizes a higher degree of safety.

In an embodiment, the first neck region impact reduction apparatus and the second neck region impact reduction apparatus have different thresholds for impact loads under which to operate.

Setting different thresholds for the loads under which the first neck region impact reduction apparatus and the second neck region impact reduction apparatus operate in this manner makes it possible to operate only one of the neck region impact reduction apparatuses, such as the second neck region impact reduction apparatus, or operate the multiple neck region impact reduction apparatuses, depending on the size of the predicted impact load or the actual collision load.

In an embodiment, the first neck region impact reduction apparatus and the second neck region impact reduction apparatus are set to have different operation start timings.

This makes it possible to set the operation starting timings to operation timings that facilitate suppression of a sense of discomfort imparted on the occupant. This in turn makes it possible to further reduce a sense of discomfort caused by multiple neck region impact reduction apparatuses operating simultaneously.

Note that a combination in which one neck region impact reduction apparatus begins to operate when a collision has been predicted and one neck region impact reduction apparatus begins to operate under a predetermined impact load, a combination in which the respective neck region impact reduction apparatuses are set to operate under different impact loads and the operation start timings differ depending on the size of the impact loads, and the like can be given as examples of the multiple neck region impact reduction apparatuses that have different operation start timings.

In an embodiment, the operation of the second neck region impact reduction apparatus is performed before the operation of the first neck region impact reduction apparatus when a predetermined impact load has occurred.

In this manner, the impact reduction member serving as the second neck region impact reduction apparatus operates first when a predetermined impact load has occurred, which causes the body of the occupant to sink significantly first, and thereafter, the active headrest serving as the first neck region impact reduction apparatus is operated. Thus, the head region of the occupant is reliably supported. Accordingly, the amount of movement of the headrest is reduced, which makes it possible to move the headrest into a head region receiving position in a short amount of time. Furthermore, because the amount of movement of the headrest is reduced, a compact headrest is realizable without increasing the size of the apparatus for moving the headrest.

With an embodiment of the vehicle seat described above, the impact reduction member does not easily move during normal seating, which makes it possible to suppress malfunction of the impact reduction member, and the impact reduction member is stabilized. Furthermore, in a range in which the force that restores the impact reduction member into the initial state decreases when the impact reduction member moves due to a rear-end collision, the impact reduction member smoothly moves, which makes it possible to significantly move the pressure receiving member that is linked thereto and cause the occupant to sink.

In addition, it is possible to reduce impacts on the head region or the neck region by supporting the head region of the occupant, without providing a mechanism linked with the headrest for causing the headrest to move forward.

Furthermore, a mechanism or the like for transmitting loads occurring at the impact reduction member and the pressure receiving member to the headrest is not necessary, and this realizes the vehicle seat with simplicity and a lighter weight.

With an embodiment of the vehicle seat described above, the impact reduction member smoothly moves at the time of a rear-end collision, which makes it possible to significantly move the pressure receiving member and thus ensure that the occupant sinks to a high degree, as well as to make the impact reduction member more compact.

With an embodiment of the vehicle seat described above, the impact reduction member can move or rotate efficiently even when the load transmitted from the pressure receiving member at the time of a rear-end collision becomes small, and this makes it possible to ensure sinking.

With an embodiment of the vehicle seat described above, the vehicle seat with simplicity and a lighter weight compared to the prior art in which a linkage is established with the headrest. In addition, in the case where an off-balance load has occurred, the impact reduction members on the side portions on both sides move or rotate independently from each other, and thus the occupant is caused to sink in accordance with the size of the impact load. Further, the force that restores the impact reduction members into the initial state decreases along with movement of the impact reduction members. This configuration is advantageous because it makes the impact reduction members that are independent from each other move further smoothly even solely.

With an embodiment of the vehicle seat described above, the position where the engagement portions that engage the biasing element, the coupling member, and the like with the impact reduction member is disposed is selectable more freely. In addition, it makes easy to set the force by which the biasing element causes the impact reduction member to rotate to be greatest initially and gradually decrease along with the rotation. This results in the state where the impact reduction member does not easily rotate during normal seating but moves smoothly at the time of a rear-end collision.

With an embodiment of the vehicle seat described above, the portion of the seat back corresponding to the lower back region to the back region of the occupant is moved significantly backward when an impact has occurred, without interference with the various elements disposed on the outside of the seat back frame. This makes it possible to cause the occupant to sink to a sufficient extent.

With an embodiment of the vehicle seat described above, it is possible to efficiently transmit the load from the pressure receiving member that supports the body of the occupant to the impact reduction member, and thus the portion of the seat back corresponding to the lower back region to the back region of the occupant is moved significantly backward when an impact has occurred. This makes it possible to cause the occupant to sink to a sufficient extent.

With an embodiment of the vehicle seat described above, the impact reduction member is disposed in a position where the amount of sinking is large, and thus it is possible to efficiently transmit the load. Accordingly, the portion of the seat back corresponding to the lower back region to the back region of the occupant is moved significantly backward when an impact has occurred, which makes it possible to cause the occupant to sink to a sufficient extent.

With an embodiment of the vehicle seat described above, the load on the impact reduction member is transmitted efficiently in a location in which, taking the body type of the occupant into consideration, the occupant sinks the most at the time of a collision. This makes it possible to sink the lower- to mid-back region of the occupant into the seat back to a sufficient extent upon receiving an impact.

With an embodiment of the vehicle seat described above, interference with other disposed elements is preventable, and the impact reduction member is disposable using the small space more effectively.

With an embodiment of the vehicle seat described above, the impact reduction member is checkable when and after the seat back is assembled, and when the skin material has been opened.

With an embodiment of the vehicle seat described above, the operation amounts of the respective neck region impact reduction apparatuses is reduced compared to when each of the respective multiple apparatuses is used solely. Thus, the response is improved and higher degree of safety is realized.

With an embodiment of the vehicle seat described above, it is possible to operate only one of the neck region impact reduction apparatuses, such as the second neck region impact reduction apparatus, or operate the multiple neck region impact reduction apparatuses, depending on the size of the predicted impact load, or the actual collision load, and the like.

With an embodiment of the vehicle seat described above, it is possible to set the operation starting timings of the neck region impact reduction apparatuses to operation timings that facilitate suppression of a sense of discomfort imparted on the occupant. This in turn makes it possible to further reduce a sense of discomfort caused by the multiple neck region impact reduction apparatuses operating simultaneously.

With an embodiment of the vehicle seat described above, the amount of movement of the headrest is reduced, which makes it possible to move the headrest into a head region receiving position in a short amount of time. Furthermore, because the amount of movement of the headrest is reduced, a compact headrest is realizable without increasing the size of the apparatus for moving the headrest.

BRIEF DESCRIPTION OF THE DRAWINGS

Various embodiments of the invention are illustrated in the drawings and described in more detail below.

DETAILED DESCRIPTION

Hereinafter, embodiments of the invention will be described with reference to the drawings. Note that the constituent elements, the positions thereof, and the like indicated hereinafter are not intended to limit the present invention, and it goes without saying that many variations can be made within the scope of the present invention. In this specification, "vehicle" refers to a moving vehicle in which a seat can be installed, such as a surface-driving vehicle that includes wheels such as an automobile, a train, or the like, as well as airplanes, ships, and the like that do not travel on a surface. A "normal seating load" includes the seating impact occurring when an occupant sits down, a load occurring when the vehicle suddenly moves forward during acceleration, and the like. Finally, a "load at the time of a rear-end collision" refers to a large load occurring due to a rear-end collision, and includes a large impact on the vehicle from the rear, a large impact occurring while traveling in reverse, and the like; however, a load within the same range as a load occurring during normal seating is not included.

In addition, in the present specification, "neck region impact reduction apparatus" refers to an apparatus having a function for supporting the head region of an occupant using a headrest and for reducing impacts on the neck region of the occupant by reducing the distance between the headrest and the head region of the occupant when a rear impact has been predicted or an impact load from a rear-end collision has occurred.

First Embodiment

FIGS. 1 through 10B illustrate a first embodiment of a vehicle seat according to the present invention.

Figure 1:
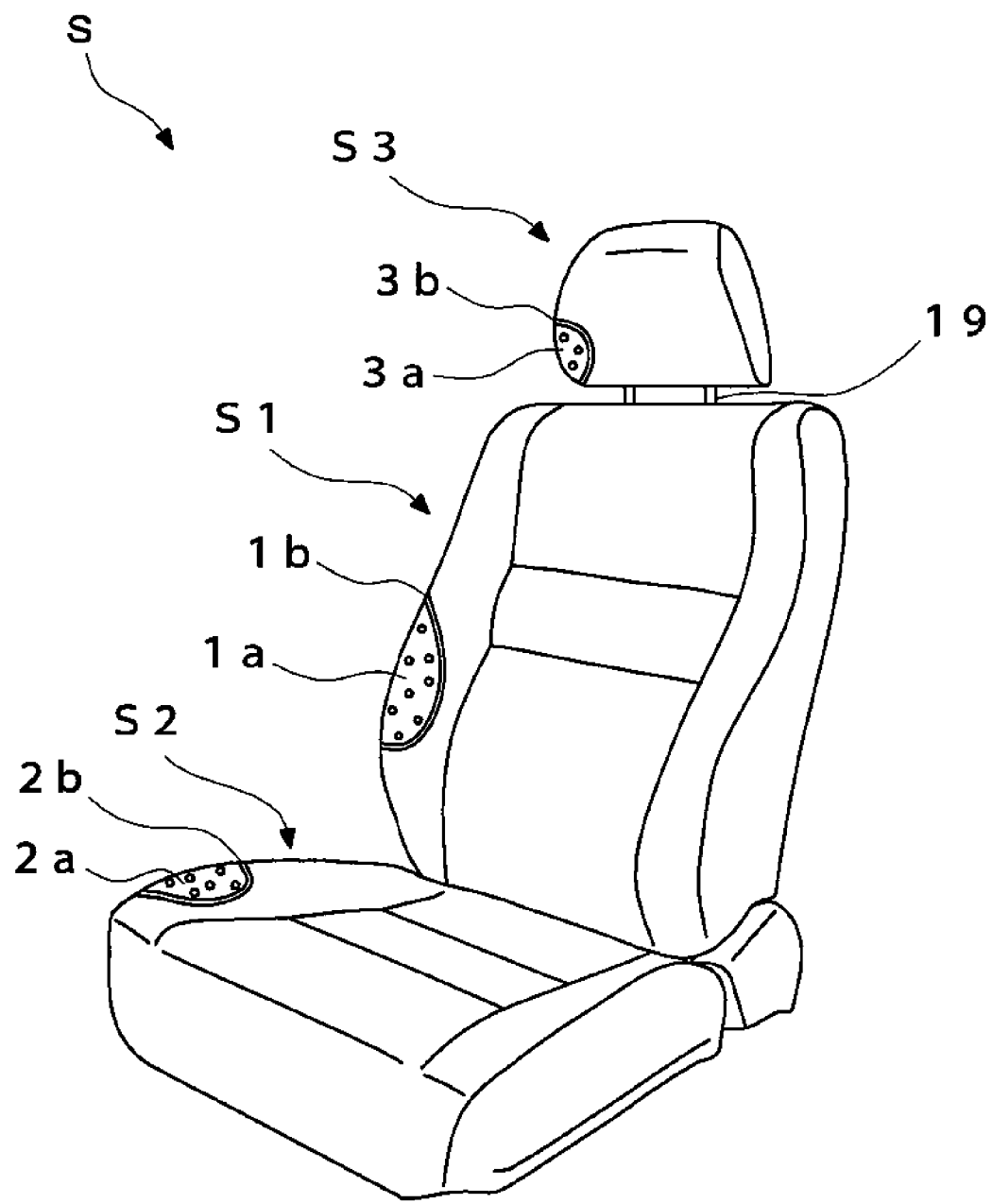
FIG. 1 is an overall perspective view of a seat according to a first embodiment of the present invention.

A vehicle seat S according to the present embodiment is, as shown in FIG. 1, configured of a seat back S1 (a back portion), a seat top portion S2, and a headrest S3; the seat back S1 (back portion) and the seat top portion S2 include cushion pads 1a and 2a on a seat frame F, and are covered by skin materials 1b and 2b. Note that the headrest S3 is formed by disposing a padding material 3a around the core of a head portion (not shown) and covering this with a skin material 3b. Reference numeral 19 indicates headrest pillars that support the headrest S3.

Figure 2:
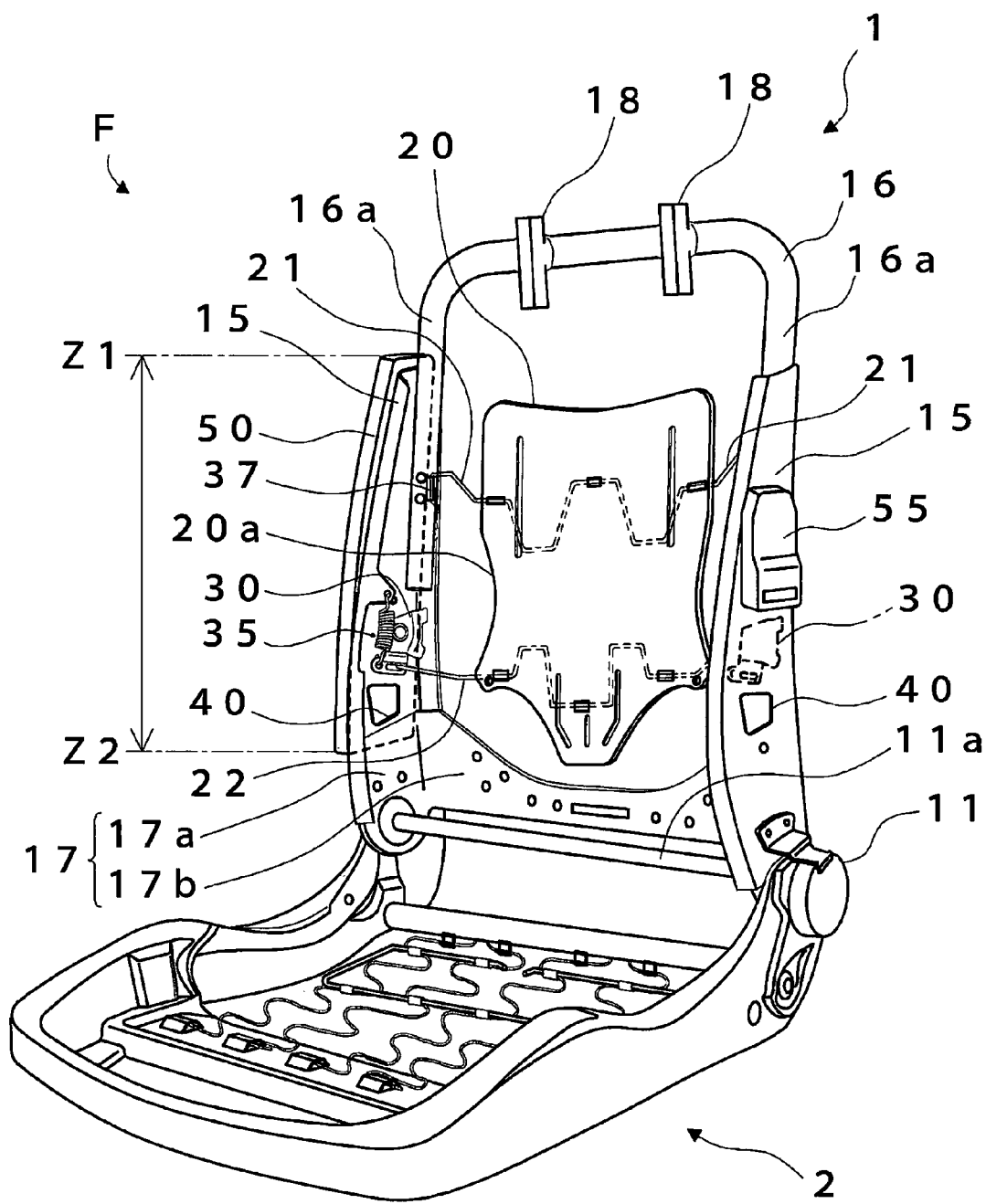
FIG. 2 is an overall perspective view of a seat frame.

The seat frame F of the vehicle seat S is, as shown in FIG. 2, comprises a seat back frame 1 that configures the seat back S1 and a seating frame 2 that configures the seat top portion S2. Note that FIG. 2 illustrates a state in which a known airbag apparatus 50 and an electrical component unit (ECU) 55 are attached to the seat back frame 1 according to the present embodiment.

The seat top portion S2 has the cushion pad 2a installed in the seating frame 2, as mentioned above, and is configured so that the cushion pad 2a is covered by the skin material 2b from above and supports an occupant from below. The seating frame 2 is supported by leg portions, and an inner rail (not shown) is attached to these leg portions; the seating frame 2 is provided, between outer rails disposed on the vehicle floor, as a sliding type whose position is adjustable forward and backward.

The rear end of the seating frame 2 is linked to the seat back frame 1 through a reclining mechanism 11.

The seat back S1 includes the cushion pad 1a in the seat back frame 1 as mentioned above, and the cushion pad 1a is covered by the skin material 1b from above; the seat back S1 thus supports the back of the occupant from the rear. In the present embodiment, the seat back frame 1 is, as shown in FIG. 2, an approximately rectangular frame member, and includes side portions, an upper portion, and a lower portion.

The side portions are disposed at a distance from each other in the left and right directions to set the width of the seat back, and have two side frames 15 extending in the vertical direction. A pipe-shaped upper frame 16 that links the side frames 15 at their upper ends extends upward from the side portions, thus configuring the upper portion. To be more specific, the pipe-shaped upper frame 16 is linked to the side frames 15, and side surface portions 16a of the upper frame 16 where the side frames 15 and the pipe-shaped upper frame 16 overlap are configured as pipe portions that span across the side portions and the upper portion.

The lower portion of the seat back frame 1 is formed by linking the lower ends of the side frames 15 using a lower frame 17. The lower frame 17 includes extension portions 17a that are linked to the respective lower sides of the side frames 15 and extend downward, and a middle portion 17b that links the extension portions 17a; the extension portions 17a extend within a range that does not cause problems in terms of the relation with the seating frame 2.

Note that, although the seat back frame 1 according to the present embodiment is formed of separate components, or the side frames 15, the upper frame 16, and the lower frame 17, the seat back frame 1 can also be formed of a single pipe frame, a single plate-shaped frame, or the like.

Figure 6:
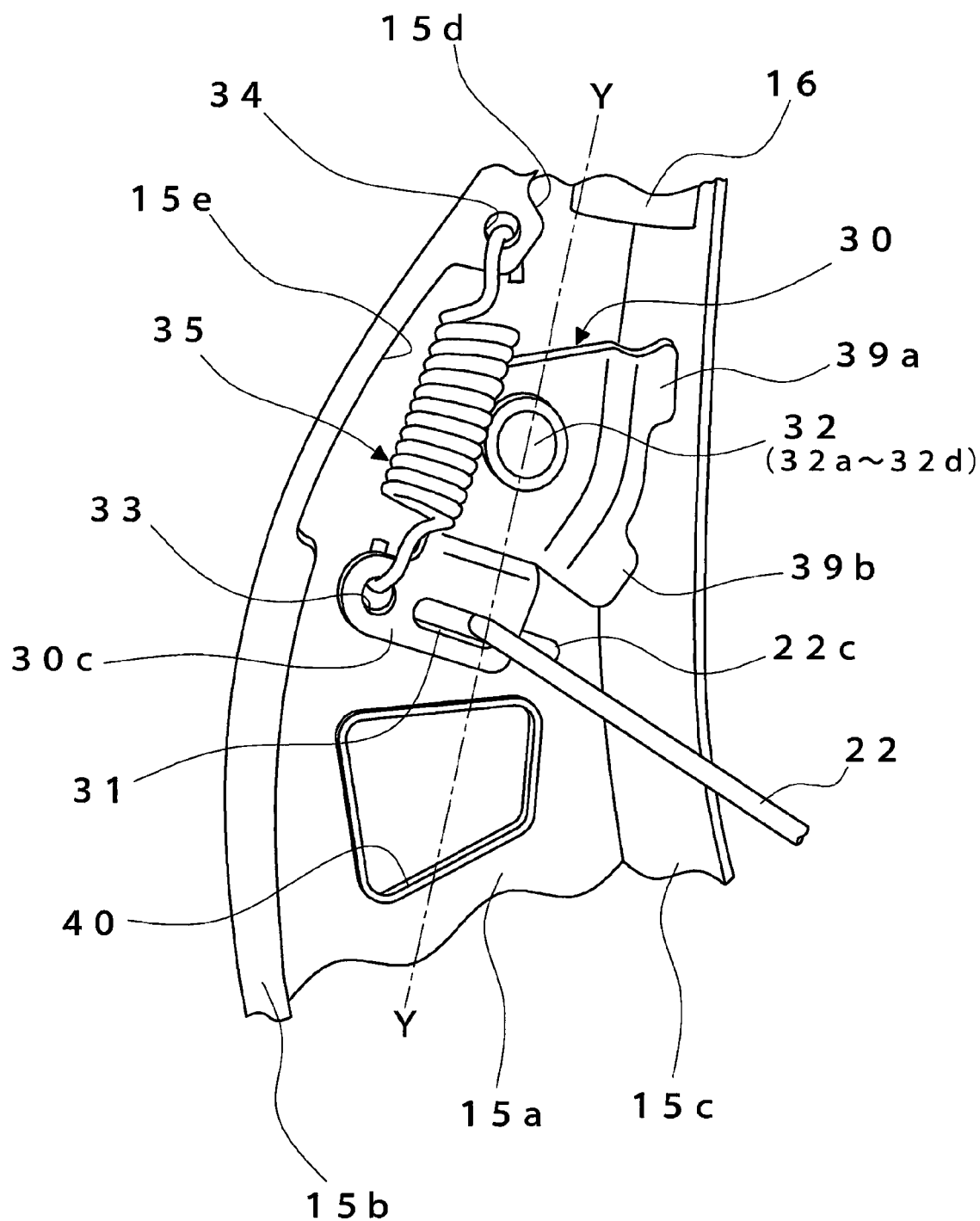
FIG. 6 is an enlarged perspective view diagram illustrating a relation between the impact reduction member and a biasing element.

The side frames 15 according to the present embodiment are extending members that configure the side surface portions of the seat back frame 1, and, as shown in FIG. 6, each of the side frames 15 includes: a flat plate-shaped side plate 15a; a front edge 15b that bends backwards toward the inside in a U shape from the front end (the end located toward the front of the vehicle) of the side plate 15a, and a rear edge 15c that curves toward the inside in an L shape from the rear end of the side plate 15a. Both ends of the side plate 15a (the front edge 15b and the rear edge 15c) disposed toward the front and back of the vehicle are bent toward the inside of the seat back frame 1 (that is, the seat) in what are essentially squared-U shapes when viewed on the cross-section.

As shown in FIGS. 2 and 6, both of the side plates 15a according to the present embodiment are located in the lower side of the respective side frames 15, and a wire hole 40 for such as a wire harness or the like is formed in the upper side of the lower frame 17. Note that as shown in FIG. 2, in the side frames 15 according to the present embodiment, a known airbag apparatus 50 is attached to the outer left side of the side frames 15 when facing forward in FIG. 2, and the electrical component unit (ECU) 55, which is configured as a box, is attached to the outer right side. The stated airbag apparatus is attached to the side frames 15 using attachment tools such as bolts, screws, and other types of fasteners.

Figure 3:
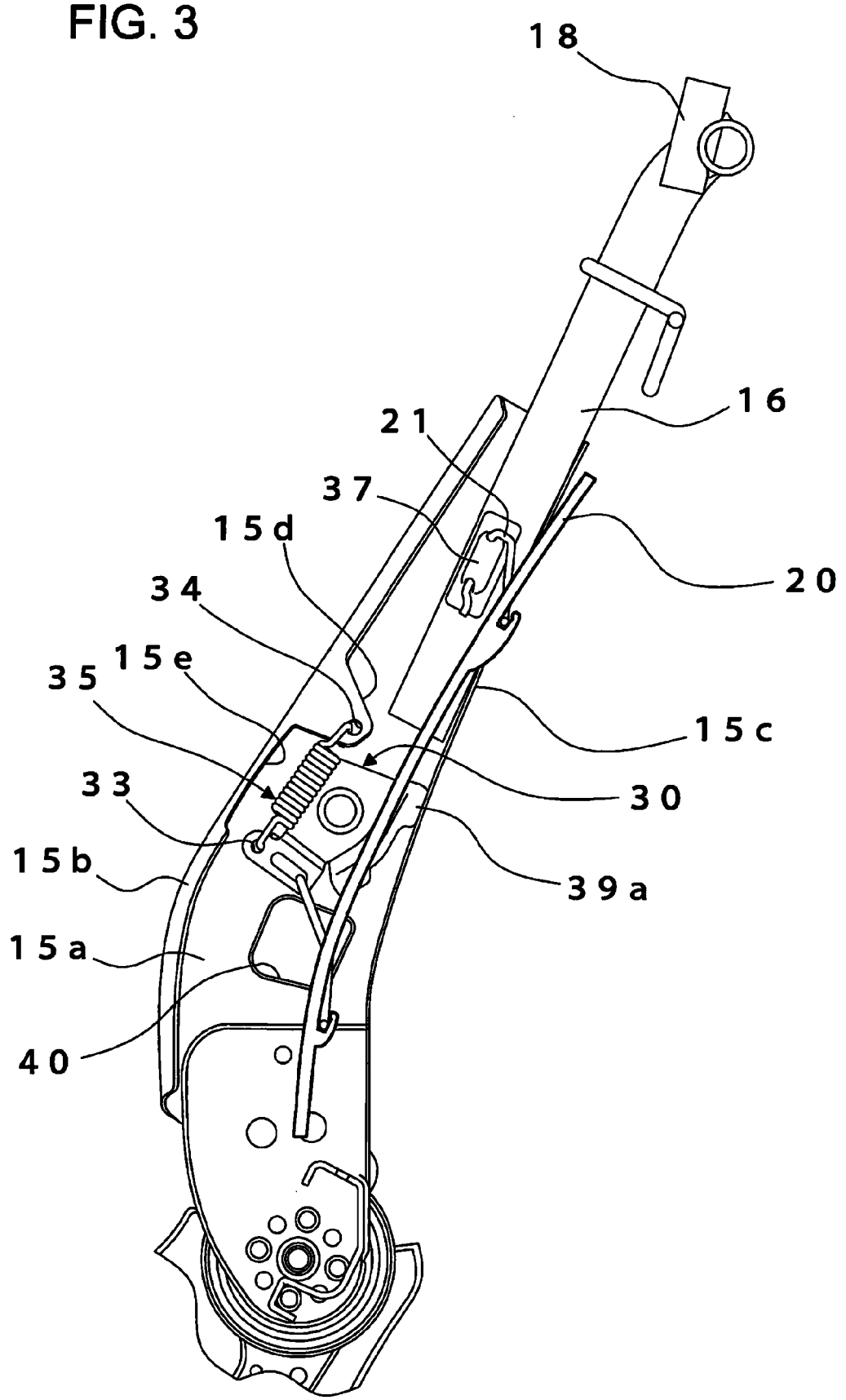
FIG. 3 is an overall cross-sectional view of a seat back frame prior to the movement of an impact reduction member.
Figure 7:
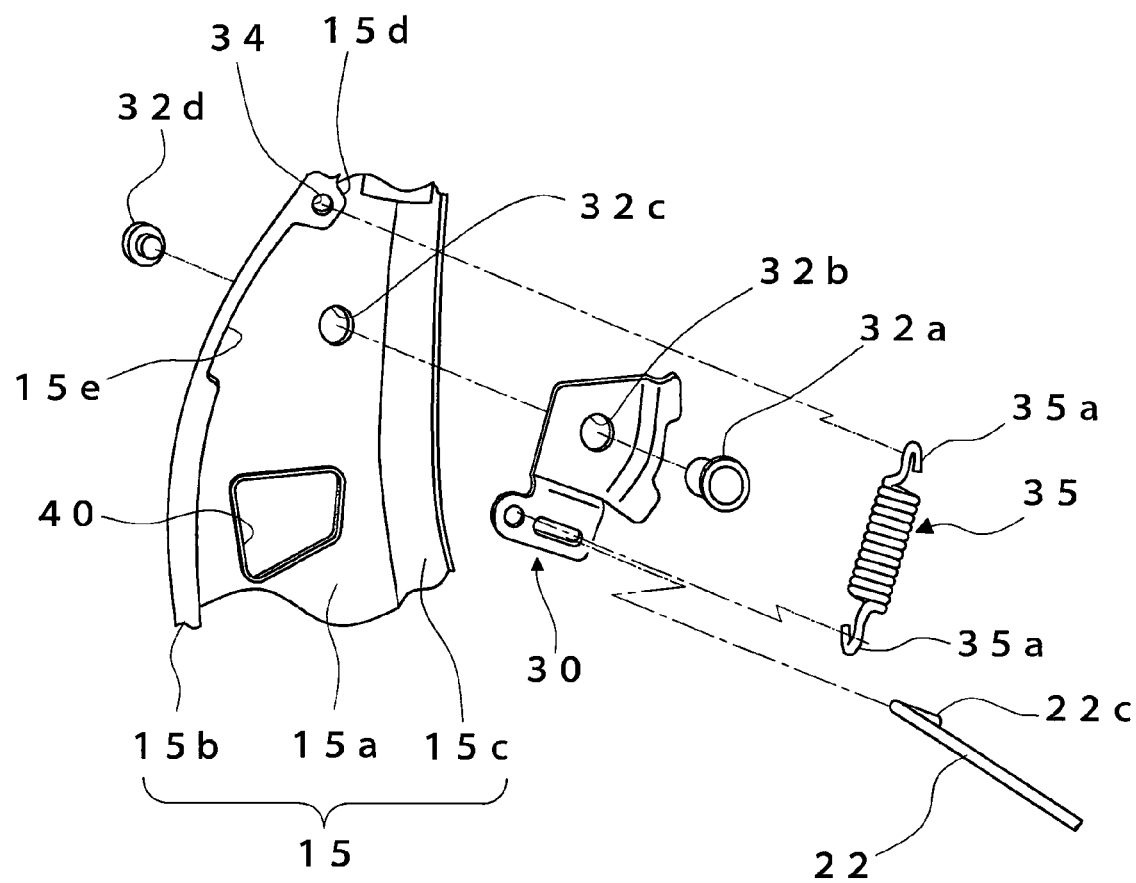
FIG. 7 is an exploded explanation diagram illustrating the impact reduction member and the biasing element.

As shown in FIG. 3, FIG. 6, and FIG. 7, a protruding portion 15d that protrudes toward the rear edge 15c is formed in the front edge 15b according to the present embodiment, and a locking hole 34 serving as a locking portion for locking an extension spring 35 is formed in this protruding portion 15d.

Furthermore, a cutout portion 15e is formed in the front edge 15b below the protruding portion 15d, extending to an area that opposes the position at which the extension spring 35 serving as a biasing element is disposed, and cutting toward the front of the vehicle and reducing the width of the front edge 15b. This cutout portion 15e makes it possible to prevent interference with the extension spring 35.

As shown in FIG. 2, the upper frame 16 is an approximately U-shaped member, and the side surface portions 16a of the upper frame 16 are disposed to partially overlap with the side plates 15a of the side frames 15 and are then welded to the side frames 15 at the overlapping portions.

The headrest S3 is disposed upon a upper side of the upper frame 16 that configures the upper portion. As described earlier, the headrest S3 is configured by providing a padding material 3a around a core (not shown) and covering the outside of the padding material 3a with the skin material 3b. Pillar support portions 18 are provided in the upper frame 16. The headrest pillars 19 (see FIG. 1) that support the headrest S3 are attached to the pillar support portions 18 via guide locks (not shown) to attach the headrest S3.

The side frames 15, serving as side portions that configure part of the seat back frame 1, are, as described earlier, configured having a predetermined length in the vertical direction, and are disposed to oppose each other with a predetermined interval therebetween in the horizontal direction. A pressure receiving member 20, which supports the cushion pad 1a from the rear and serves as a supporting member that supports the body of the occupant and that can move independently from the headrest S3, is disposed within the seat back frame 1 (between the two side frames 15) and in the inner region of the seat back frame 1.

Figure 5:
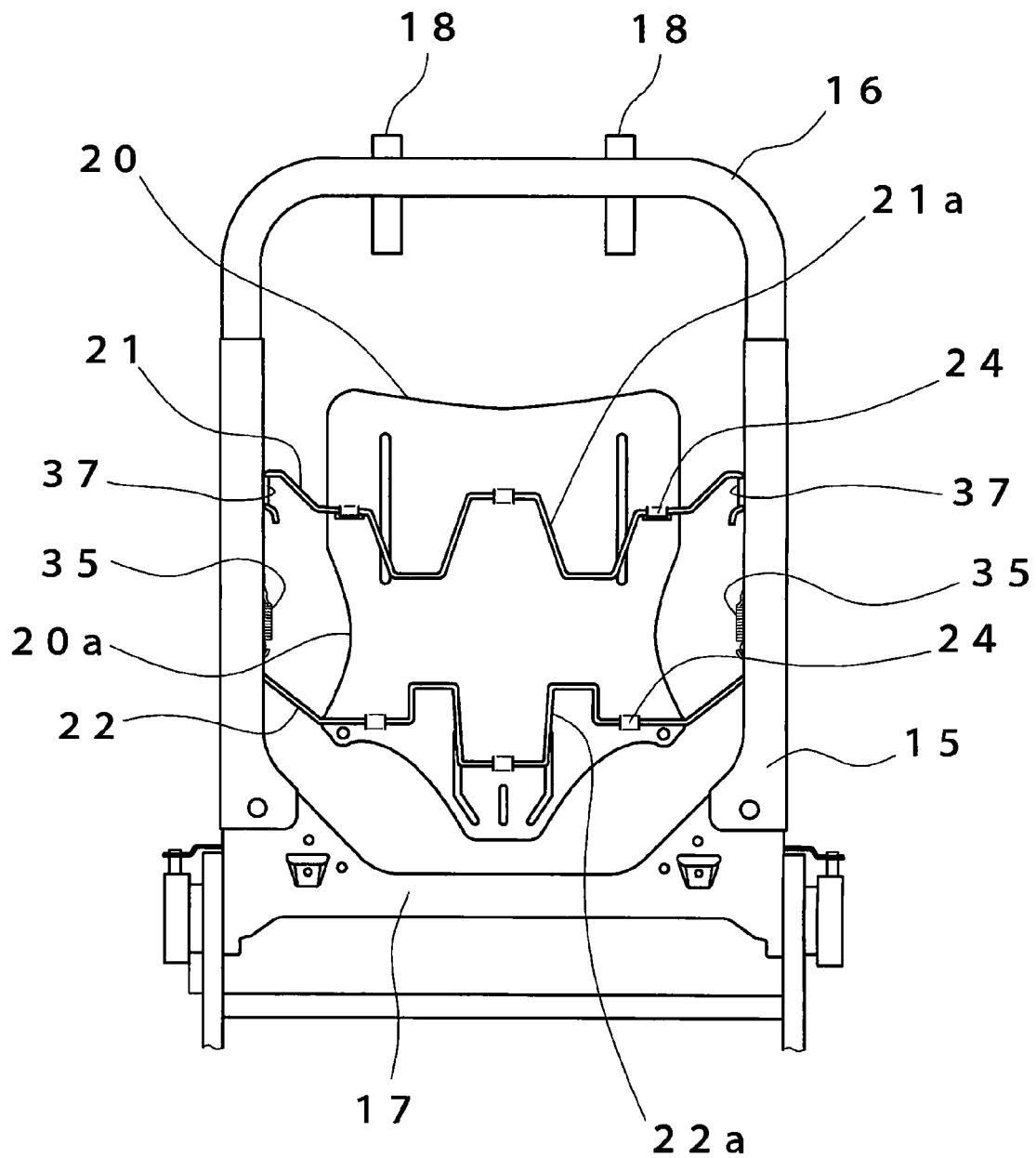
FIG. 5 is an overall rear-view diagram showing the seat back frame from the rear.

The pressure receiving member 20 according to the present embodiment is configured to not be linked to the headrest S3, and is a member formed of a resin in an approximately rectangular plate shape; recess portions 20a are formed in both sides of the pressure receiving member 20. Furthermore, gentle bumps and depressions are formed in the surface of the pressure receiving member that makes contact with the cushion pad 1a. As shown in FIG. 5, claw portions 24 for locking wires 21 and 22 are formed in the upper side and lower side of the rear side of the pressure receiving member 20.

The pressure receiving member 20 according to the present embodiment is supported by a coupling member. In other words, the two wires 21 and 22 serving as the coupling member are installed between the two side frames 15, and are locked to the pressure receiving member 20 by the claw portions 24 formed in predetermined locations at the upper side and lower side of the rear side of the pressure receiving member 20; thus the pressure receiving member 20 is supported by the rear surface of the cushion pad 1a. The wires 21 and 22 are formed of steel wires having spring force, and as shown in FIG. 5, recess and protrusion portions 21a and 22a, which are bent areas, are formed in the wires 21 and 22 partway between the side frames 15.

In particular, of the two wires 21 and 22 that are locked into the pressure receiving member 20 according to the present embodiment, the wire 22 that is positioned on the lower side is configured to deform significantly due to a load that is greater than or equal to a predetermined load (that is, a load greater than a load that causes an impact reduction member, mentioned below, to move or pivot) as the result of the recess and protrusion portion 22a, and thus the pressure receiving member 20 moves backward with a higher amount of movement.

Figure 4:
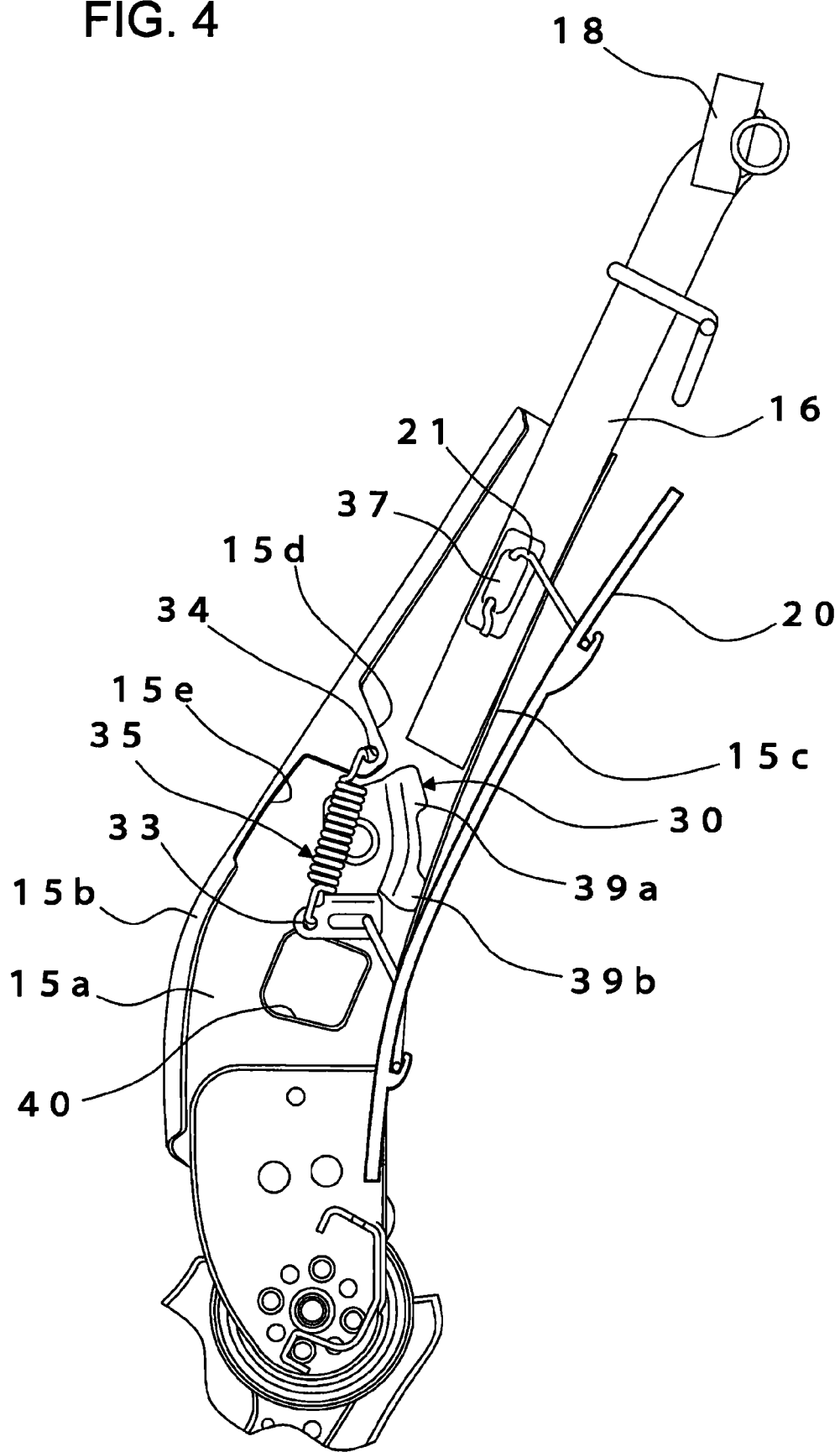
FIG. 4 is an overall cross-sectional view of the seat back frame following the movement of the impact reduction member.

As shown in FIGS. 3 and 4 and FIG. 6, of the two wires 21 and 22 that are locked into the pressure receiving member 20 of the present embodiment, both ends of the wire 21 that is locked into the upper side are engaged with attachment hooks 37 provided on both sides of the side frames 15 (and specifically, on the pipe portion serving as the upper frame 16 attached to the side frames 15). Both ends of the wire 22 locked on the lower side are engaged with locking portions 31 in pivoting members 30 mounted on the left and right side frames 15.

In the present embodiment, the pivoting members 30 are employed as the impact reduction member that coordinates with the pressure receiving member 20, which serves as a member that supports the body of the occupant, and can move independently from the headrest S3. These pivoting members 30 move, or rotate, toward the rear of the vehicle under an impact load transmitted through the coupling member (the wire 22) when an impact load that is greater than or equal to a predetermined load is exerted on the pressure receiving member 20 due to a rear-end collision or the like. Because the pivoting members 30 move toward the rear of the vehicle, the pressure receiving member 20 can also be caused to move significantly toward the rear of the vehicle; this makes it possible to reduce the distance between the headrest S3 and the head region of the occupant by moving the body of the occupant backward which in turn makes it possible to support the head region of the occupant and reduce the impact on the neck region. This makes it possible to reduce the impact on the occupant.

As shown in FIG. 2, the pivoting members 30 according to the present embodiment are disposed within a range enclosed within the seat back frame 1 and that is lower than the upper end of the pressure receiving member 20; the pivoting members 30 are axially supported in a freely-rotatable state by shaft portions 32 (mentioned below) on the inner sides of the side plates 15a of the side frames 15, which are located on both sides of the stated range. More specifically, the pivoting members 30 are disposed in locations in the side plates 15a of the side frames 15 that oppose the recess portions 20a of the pressure receiving member 20.

To see the pivoting members from a different angle, as shown in FIG. 2, the pivoting members 30 are disposed between the lower ends of the side surface portions 16a implemented as pipe portions and a rotation shaft 11a of the reclining mechanism 11. It is preferable for the pivoting members 30 to be disposed in a location that is within a range of 50 mm to 270 mm above a hip point. Here, the "hip point" is based on the "Road vehicles—Procedure for H-point Determination" (JIS D0024-1985); the apparatus for determining the measured hip point of a vehicle is called a three-dimensional mannequin, and the hip point is the rotational center point between the trunk region and the femoral region of the three-dimensional mannequin. This is located in the center between aiming points on both sides of the three-dimensional mannequin. The height range of 50 mm to 270 mm for the hip point is a location that, taking the body type of the occupant into consideration, sinks the most at the time of a collision, and disposing the pivoting members 30 in this range is suited to the efficient transmission of the load from the occupant.

The locations at which the pivoting members 30 serving as the impact reduction member is disposed in the present embodiment will be described in further detail. As shown in FIG. 2, a disposal range Z1 to Z2 for the airbag apparatus 50 is formed in the side frames 15 according to the present embodiment, and attachment tools such as bolts, screws, and other fasteners (not shown) for attaching the airbag apparatus 50 are provided toward the upper end Z1 and the lower end Z2 of the disposal range for the airbag apparatus 50; the pivoting members 30 are disposed in a range that does not interfere with these attachment tools, and thus the pivoting members 30 do not interfere when the airbag apparatus 50 is attached, which makes it possible to use the small space more effectively.

Furthermore, as shown in FIG. 2, in the present embodiment, the pivoting member 30 is disposed between the wiring hole 40 and the electrical component unit (ECU) 55 on the left side frame 15, and the pivoting members 30 can thus be disposed using a narrow space while ensuring the compactness of a harness and the like.

As described above, the pivoting members 30 are disposed in a region that does not interfere with the attachment tools for the various types of apparatuses such as the airbag apparatus 50, the electrical component unit (ECU) 55, and the like that is attachable to the side frames 15 later, and thus the configuration is such that the pivoting members 30 do not interfere with the attachment of the various types of apparatuses.

Furthermore, the pivoting members 30 lock the lower wire 22 serving as a coupling member, and are linked to the extension spring 35, which serves as a biasing element that biases the wire 22. In other words, the configuration is such that the pivoting members 30 are linked to the biasing element, and the pressure receiving member 20 is biased toward the front of the seat back frame 1 via the coupling member. Employing such a configuration makes it possible to effectively transmit a load from the pressure receiving member 20 to the pivoting members 30.

Figure 8:
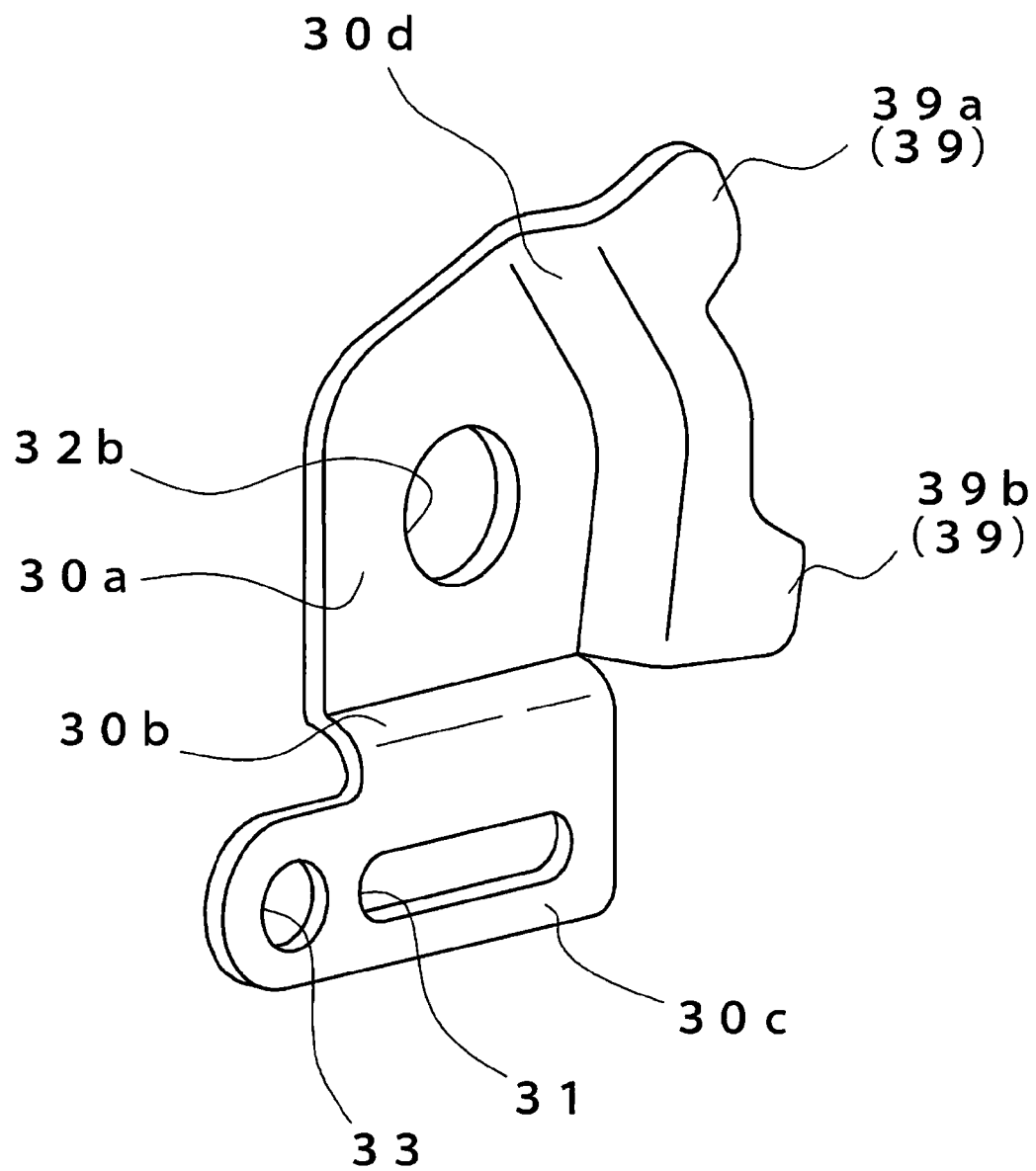
FIG. 8 is perspective view diagram illustrating the impact reduction member.

As shown in FIGS. 6 through 8, the pivoting members 30 according to the present embodiment include the shaft portions 32, which are rotatable, the locking portions 31 of the coupling members formed in locations that are a predetermined distance from the shaft portions 32, locking portions (locking holes 33) of biasing elements, and rotation blocking portions 39 (stopper portions 39a and 39b) that block rotation.

As shown in FIG. 7, the shaft portions 32 comprise shaft members 32a, shaft holes 32b provided in the pivoting members 30, holes 32c provided in the side plates 15a of the side frames 15, and matching members 32d; the shaft members 32a are inserted into the shaft holes 32b and fitted into the holes 32c and the matching members 32d are interlocked from the tip end sides of the shaft members 32a, thus axially supporting the pivoting members 30 in a freely-rotatable state.

In this manner, the pivoting members 30 are provided along the side plates 15a of the side frames 15 and are provided on the inner sides of the side frames 15, which are approximately squared-U-shaped when viewed on the cross-section, in the area enclosed by the side plates 15a, the front edges 15b, and the rear edges 15c; accordingly, the amount by which the pivoting members 30 protrude from the side frames 15 toward the inside of the seat is suppressed, which allows for a compact disposition and suppresses interference with the occupant.

The locking portions 31 of the coupling member (wire 22) according to the present embodiment are formed as long holes in order to facilitate the attachment of the bent, hook-shaped ends of the wire 22 serving as the coupling member. Formation portions 30c of the locking portions 31 are formed to continue from an outer side of base portions 30a that configure the pivoting members 30 and so that first upright portions 30b protrude upright from the base portions 30a; the first upright portions 30b are formed to extend in the outward direction. The first upright portions 30b are formed in locations that, when the shaft portions 32 are taken as the centers, are distanced from a position in a predetermined interval between the stopper portions 39a and 39b of the rotation blocking portions 39 by approximately 90 degrees.

The locking portions (locking holes 33) of the biasing elements according to the present embodiment lock the ends of the extension spring 35, which serves as the biasing elements, and are formed further toward the front of the vehicle than the locking portions 31 in the formation portions 30c in which the locking portions 31 are formed. In other words, as shown in FIG. 6, the locking holes 33 are formed in a location further toward the front of the vehicle than a line Y that connects the shaft portions 32 and the locations of the wire 22 in the locking portions 31.

The biasing elements according to the present embodiment is the extension spring 35 formed by coiling a spring wire member, and as shown in FIG. 6, each extension spring 35 is locked into the locking holes 33 of the pivoting members 30 and the locking holes 34 in the protruding portions 15d of the side frames 15; as a result, the pivoting members 30 are biased toward the front of the seat back frame 1. Hooks 35a for locking both ends of the extension spring 35 are formed as semicircles in both ends of the extension spring 35.

The rotation blocking portions 39 (stopper portions 39a and 39b) according to the present embodiment block rotation when the pivoting members 30 rotate, and as shown in FIG. 8, extending portions extending further in the outer direction from second upright portions 30d that protrude upright from the base portions 30a and continue from the outer sides of the base portions 30a that slide along the side plates 15a when the pivoting members 30 rotate along the shaft portions 32 are formed at a predetermined interval (with a recess therebetween).

These extending portions are the stopper portions 39a and 39b, and regulate the rotation of the pivoting members 30. The predetermined interval between the stopper portions 39a and 39b is set so that the stopper portions 39a constantly make contact with the rear edges 15c of the side frames 15 and prevent the rotation of the pivoting members 30, but the stopper portions 39b make contact with the rear edges 15c and block the rotation when the pivoting members 30 have rotated due to a rear-end collision, in order to regulate the rotation of the pivoting members 30 between upper and lower limit positions within a set rotational range. In other words, the stopper portions 39a that set the pre-rotation initial position and the stopper portions 39b that set the post-rotation stopping position are formed at a predetermined interval to regulate the upper and lower limit positions of the set rotational range of the pivoting members 30.

The rotation blocking portions 39 (stopper portions 39a and 39b) are formed at locations that do not interfere with the biasing elements (extension springs 35), the coupling member (wire 22), and the like, as will be mentioned below.

The aforementioned pivoting members 30 are attached to both side frames 15, and hook portions 22c that are the ends of the wire 22 are engaged with the locking portions 31 of the pivoting members 30 on both sides; thus the configuration is such that the respective pivoting members 30 operate independently. The configuration is also such that the pivoting members 30 operate independently from the headrest S3.

In the present embodiment, the pivoting members 30 are attached to both of the side frames 15, and the pivoting members 30 that have been attached to both of these frames are configured to rotate independently of each other. For this reason, in the case where an off-balance load has occurred, the pivoting members 30 on the side portions on both sides rotate independently of each other in accordance with the load, and thus the body of the occupant is caused to sink in accordance with the severity of the impact load.

During normal seating, in which an occupant is seated, tension that causes the pivoting members 30 to rotate backwards occurs via the cushion pad 1a, the pressure receiving member 20, and the wire 22 within the seat back S1; the extension springs 35 bias the pivoting members 30 to rotate toward the front of the seat back frame 1. Here, the extension springs 35 linked to the pivoting members 30 have load properties in which the extension springs 35 do not warp with a load region occurring during normal seating, and thus the pivoting members 30 are constantly stopped in the initial position by the stopper portions 39a on the initial position side making contact with the rear edge sides 15c of the side frames 15. In other words, the configuration is such that a force that resists the force that rotates the pivoting members 30 and that restores the pivoting members 30 into the initial state is greatest during normal seating.

Figure 9:
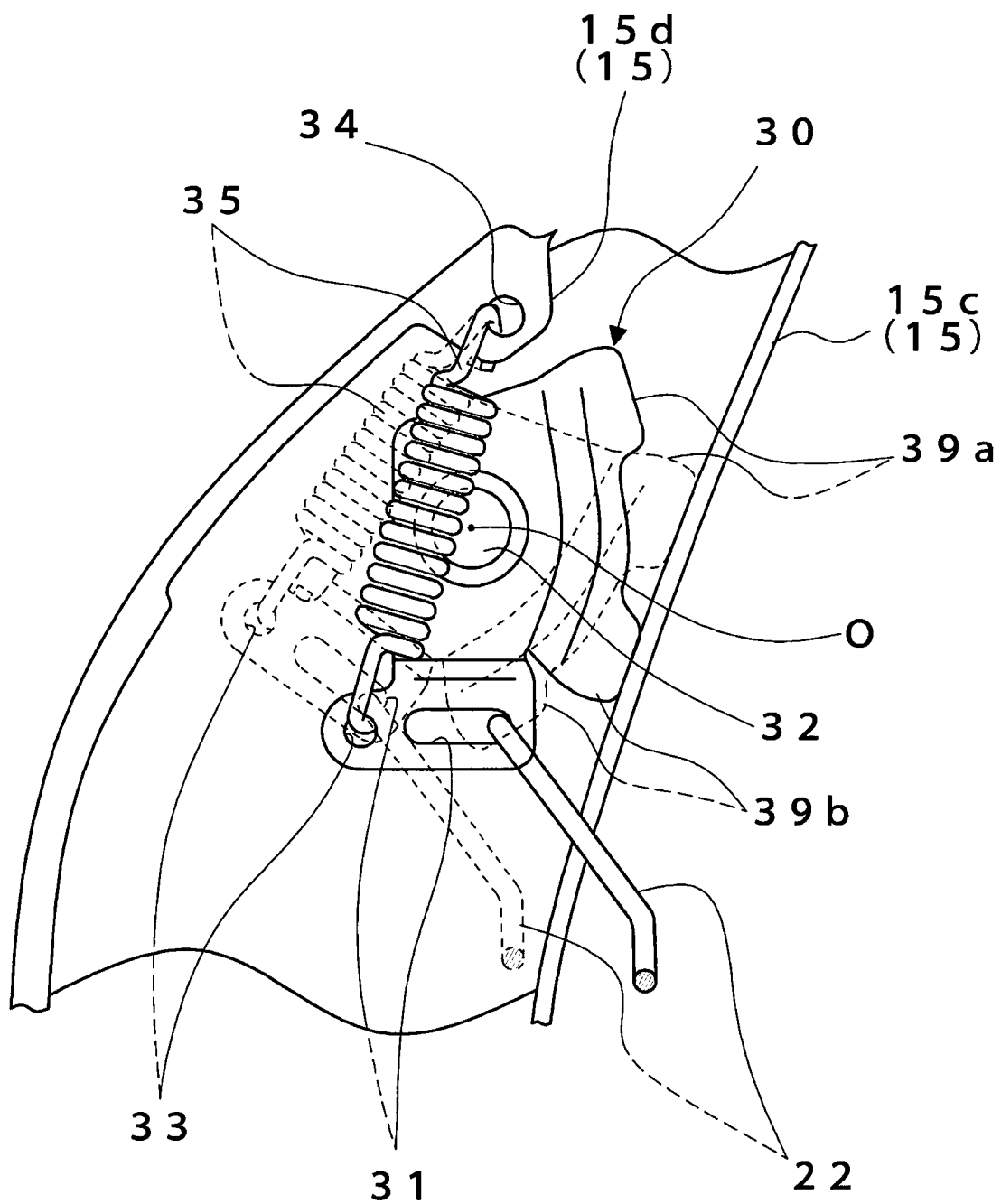
FIG. 9 is a side view diagram illustrating the states of the impact reduction member and the biasing element before and after a rear-end collision.
Figure 10A:
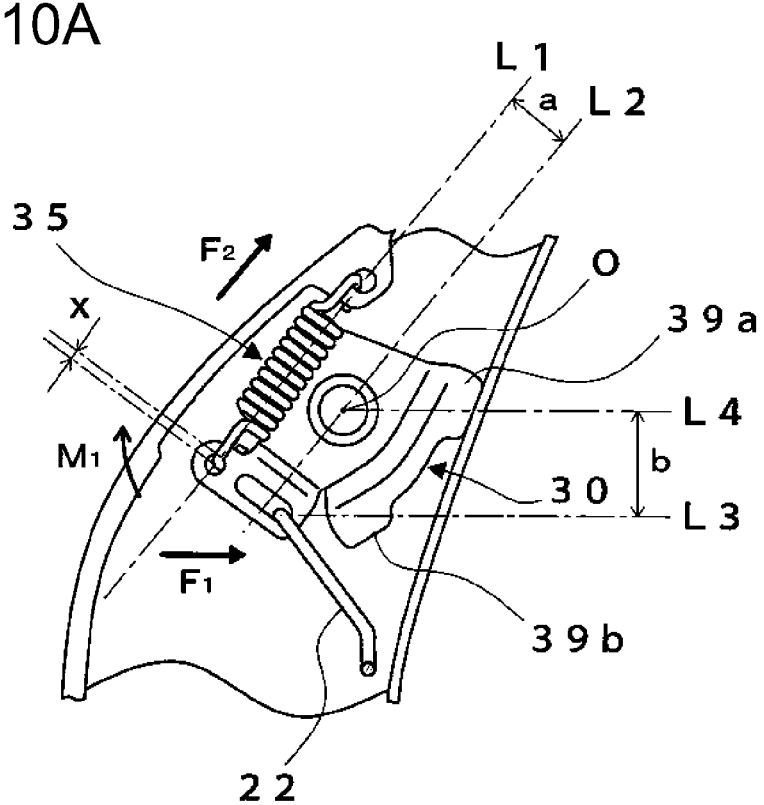
FIGS. 10A, B are side view diagrams diagram illustrating the states of the impact reduction member and the biasing element before and after a rear-end collision.
Figure 10B:
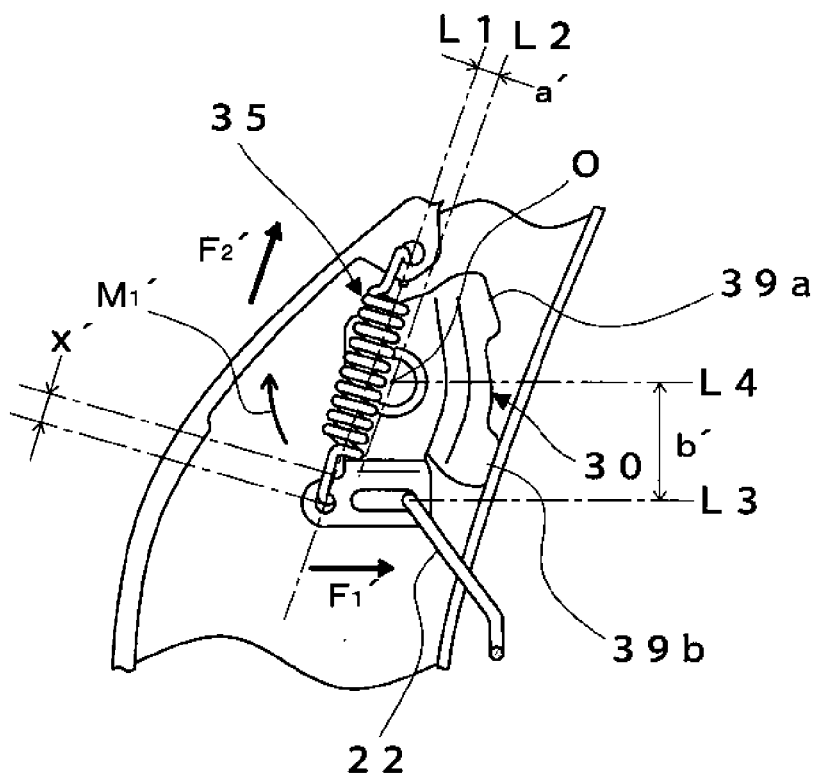

With respect to the pivoting members 30 at the time of a rear-end collision, FIG. 3 indicates the pre-rotation impact reduction member, FIG. 4 indicates the post-rotation impact reduction member, and in FIG. 9, the dotted line indicates a state prior to a rear-end collision while the solid line indicates a state after a rear-end collision; finally, in FIG. 10A indicates a state prior to a rear-end collision and FIG. 10B indicates a state following a rear-end collision. At the time of a rear-end collision, as shown in FIG. 9 and FIGS. 10A, B, the impact occurs from the rear, and inertia force causes the occupant to move backward; this load goes through the pressure receiving member 20 (not shown in FIG. 9 and FIGS. 10A, B) and the wire 22 that is locked in the pressure receiving member 20, and tension in the direction that causes the pivoting members 30 to rotate backward (that is, to the right in FIG. 9 and FIGS. 10A, B) is generated. The tension at this time causes the extension springs 35 that hold the pivoting members 30 in their initial positions to extend, and thus the load becomes a load that is sufficient to rotate the pivoting members 30 backward.

The threshold for the force that causes the rotation of the pivoting members 30 to start is set to a value that is greater than the normal seating load.

Here, with respect to the threshold for the force that causes the rotation of the pivoting members 30, the load upon the seat back S1 during normal seating (excluding small impacts arising due to seating impacts, sudden movements of the vehicle forward, and the like) is approximately 150 N, and thus it is preferable for the threshold to be a value that is greater than 150 N. If the value is lower than this, movement will occur even during normal seating, which results in less stability and is therefore undesirable.

Furthermore, taking into consideration seating impacts occurring during normal seating, loads arising during acceleration caused by sudden forward movement of the vehicle, and the like, it is preferable to set the value to be greater than 250 N; doing so makes it possible to maintain a stable state, with the pivoting members 30 operating only at the time of a rear-end collision.

As described earlier, by rotating the pivoting members 30 backward, the wire 22 that is engaged in the locking portions 31 moves backward; along with this, the pressure receiving member 20 that is locked to the wire 22 and the cushion pad 1a that is supported by the pressure receiving member 20 move backward, which makes it possible to cause the occupant to sink into the seat back S1.

Hereinafter, the rotational properties of the pivoting members 30 at the time of a rear-end collision will be described in further detail with reference to FIG. 9 and FIGS. 10A, B.

In a pre-rotation initial position of the pivoting members 30, the locking portions 31 that lock the wire 22 and the locking holes 33 that lock the lower ends of the extension springs 35 are disposed in a position that is closer to the front of the vehicle than the shaft portions 32, and the upper ends of the extension springs 35 are locked into the locking holes 34 formed in the protruding portions 15d of the side frames 15 located above the pivoting members 30.

In other words, in the initial state, the extension springs 35 are extended by a distance x, and as a result, the pivoting members 30 are biased in the rotational direction indicated by the arrow in FIG. 10A at a rotational momentum $M_1$; the coupling member (wire 22) that is linked to the pivoting members 30 is also biased in the forward direction. At this time, the stopper portions 39a of the rotation blocking portions 39 make contact with the rear edges 15c of the side frames 15, thus preventing the pivoting members 30 from rotating in the direction of $M_1$ due to the extension springs 35.

When a rear-end collision occurs, a tension that is greater than or equal to a predetermined tension is exerted on the wire 22, and the pivoting members 30 begin to rotate against the extension springs 35; as a result, the extension springs 35 extend, and the locking holes 33 provided in the pivoting members 30 move backward while rotating around a rotational center O of the shaft portions 32. Then, as shown in FIG. 9, the pivoting members 30 rotate until the rotation of the pivoting members 30 is blocked by the stopper portions 39b of the rotation blocking portions 39 making contact with the rear edges 15c of the side frames 15. Through this, the pressure receiving member 20 moves significantly backward from the seat frame 1, from the state shown in FIG. 3 to the state shown in FIG. 4, and the amount of sinking increases as a result.

In the present embodiment, when the pivoting members 30 rotate and the pressure receiving member 20 moves, the upper ends of the extension springs 35 are anchored to the locking holes 34 that are above the pivoting members 30, and thus the configuration is such that the direction in which the locking holes 33 move and in the direction in which the extension springs 35 extend do not match.

In other words, the configuration is such that the rotational amount of the pivoting members 30 and the extension load (the warp amount) of the extension springs 35 are not in proportion with each other; to rephrase, the rotational angle of the pivoting members 30 and the forward rotational direction torque (rotational force) applied by the extension springs 35 are in a relation that is not in a simple proportion.

In other words, the locking holes 33 that lock the lower ends of the extension springs 35 trace an arc-shaped trajectory with the shaft portions 32 as the rotational centers thereof, whereas the locking holes 34 that lock the upper ends of the extension springs 35 are formed as fixed ends that are anchored and affixed to the upper ends of the pivoting members 30.

For this reason, the extension load (warp amount) of the extension springs 35 is maximum when the rotational center O of the shaft portions 32 and the locking holes 33 and 34 to which both ends of the extension springs 35 are locked are arranged on a straight line, but the amount of change in the distance between the locking holes 33 and the locking holes 34 that lock the extension springs 35 is low at an area immediately before this maximum load point, or in other words, in the vicinity of the rotational amount at which the trajectory traced by the locking holes 33 provided in the pivoting members 30 is at the furthest position from the locking holes 34 that lock the other ends of the extension springs 35; therefore, a region arises in which the amount of change in the extension load of the extension springs 35 relative to the rotational angle is minute.

In the present embodiment, the amount of backward rotation at the position at which the pivoting members 30 are stopped by the stopper portions 39b is set to be immediately before the maximum load point of the extension springs 35.

For this reason, when the pivoting members 30 begin to rotate, the tension arising when the pivoting members 30 make contact with the stopper portions 39b and the rotation thereof is stopped (that is, when the rotation ends) is approximately the same value as the tension arising through the wire 22.

Here, a relation among the biasing elements (extension springs 35), the coupling member (wire 22), the impact reduction member (pivoting members 30), and a load will be further described. The reference numerals indicated in FIGS. 10A and 10B are as follows.

$$M_1 = F_2 \times a, M_1' = F_2' \times a'$$

where
$M_1, M_1'$: rotational momentum;
$F_1, F_1'$: load in the backward direction;
$F_2, F_2'$: extension force of the spring;
a, a': the distance between the rotational center and the fixed position of the biasing element (spring); specifically, the distance between a first imaginary line L1 that connects both ends of the biasing element and a second imaginary line L2 that is parallel to the first imaginary line L1 and passes through the rotational center, where a is the pre-rotation distance, and a' is the post-rotation distance;

b, b': the distance between the rotational center and the coupling member (wire); specifically, the distance between a third imaginary line L3 that is parallel to a horizontal line passing through the area where the impact reduction member and the coupling member (wire) are linked and a fourth imaginary line L4 that is parallel to the third imaginary line L3 and passes through the rotational center, where b is the pre-rotation distance, and b' is the post-rotation distance;

x, x': extension of the spring;

$F_2'=F_2+\Delta_x \times k$, where k represents a spring constant and $\Delta_x = x'-x$.

In the present embodiment, in order to favorably maintain a seating state during normal seating, a certain degree of resistance is necessary, and it is thus preferable to keep the holding load of the pivoting members 30 constant during normal seating and reduce the operational load at the time of a collision. For this reason, it is preferable to set the load to be low when the pivoting members 30 operate, and thus the resistance to the force with which the pivoting members 30 rotate, or in other words, the momentum by which the extension springs 35 rotate the pivoting members 30, is set to be highest in the initial state (during normal seating) and lower during rotation.

In the present embodiment, as shown in FIGS. 10A, B, the configuration is such that the extension springs 35 move closer to the rotational center O the further the pivoting members 30 rotate, causing the distance a to become short. Accordingly, the extension springs 35 that are used ensure that the rotational momentum $M_1$ in the initial state ($F_2 \times a$) is the highest and the rotational momentum $M_1'$ ($F_2' \times a'$) during rotation (and post-rotation) is lower than the rotational momentum $M_1$; the rotational momentum that rotates the pivoting members 30 is high initially and gradually tapers off as the rotation continues.

For example, if the extension force $F_2'$ of the spring is doubled and the distance a' between the rotational center and the fixed position of the spring is less than half, it can be seen that the force that rotates the impact reduction member has weakened.

In this manner, with the pivoting member 30 serving as the impact reduction member, the rotational momentum $M_1$ in the initial state ($F_2 \times a$) is the highest and the rotational momentum $M_1'$ ($F_2' \times a'$) becomes lower than the rotational momentum $M_1$ in accordance with the rotation, or in other words, the force by which the extension springs 35 restore the pivoting members 30 into their initial states gradually decreases, and thus when the pivoting members 30 begin to rotate at the time of a rear-end collision, the pivoting members 30 move with more ease thereafter.

In FIGS. 10A and 10B, in order for the pivoting members 30, the extension springs 35, and the coupling member (wire 22) to be balanced when at rest, it is necessary for $F_1 \times b$, or the force from the occupant (the force that moves the pivoting members 30), and $F_2 \times a$, or the rotational momentum (resting force), to reach equilibrium or for the rotational momentum to be greater, as expressed by Equation 1, below, where the rotational momentum is ($M_1 = F_2 \times a$), the load in the backward direction is ($F_1$), the extension force of the spring is ($F_2$), the distance between the rotational center and the fixed position of the spring is (a), the distance between the rotational center and the coupling member (wire 22) is (b). Note that in the case where the rotational momentum is great, the rotation of the pivoting members 30 is blocked by the stopper portions 39a.

$$F_1 \times b \leq F_2 \times a \qquad \text{(Equation 1)}$$

On the other hand, in order to achieve balance in a state in which the pivoting members 30 have moved, it is necessary for $F_1' \times b'$, or the force from the occupant (the force that moves the pivoting members 30), and $F_2' \times a'$, or the rotational momentum (resting force), to reach equilibrium or for the force from the occupant to be greater, as expressed by Equation 2, below. Note that in the case where the force from the occupant is greater and the pivoting members 30 have moved to a predetermined position, the rotation of the pivoting members 30 is blocked by the stopper portions 39b.

$$F_1' \times b' \geq F_2' \times a' \qquad \text{(Equation 2)}$$

As described thus far, the threshold of the tension when the pivoting members 30 begin to rotate is set to a high value at which the pivoting members 30 do not rotate during a normal seating load. Because the tension exerted on the pivoting members 30 through the wire 22 at the time of a rear-end collision is impact energy, the tension has a higher value compared to the threshold. Furthermore, the force by which the extension springs 35 restore the pivoting members 30 into their initial states decreases in accordance with the rotation of the pivoting members 30.

For this reason, when the pivoting members 30 begin to rotate due to a rear-end collision, the pivoting members 30 rotate without stopping partway through until the pivoting members 30 are stopped by the stopper portions 39b, which makes it possible to cause the occupant to sink into the seat back S1 reliably.

Second Embodiment

Figure 11:
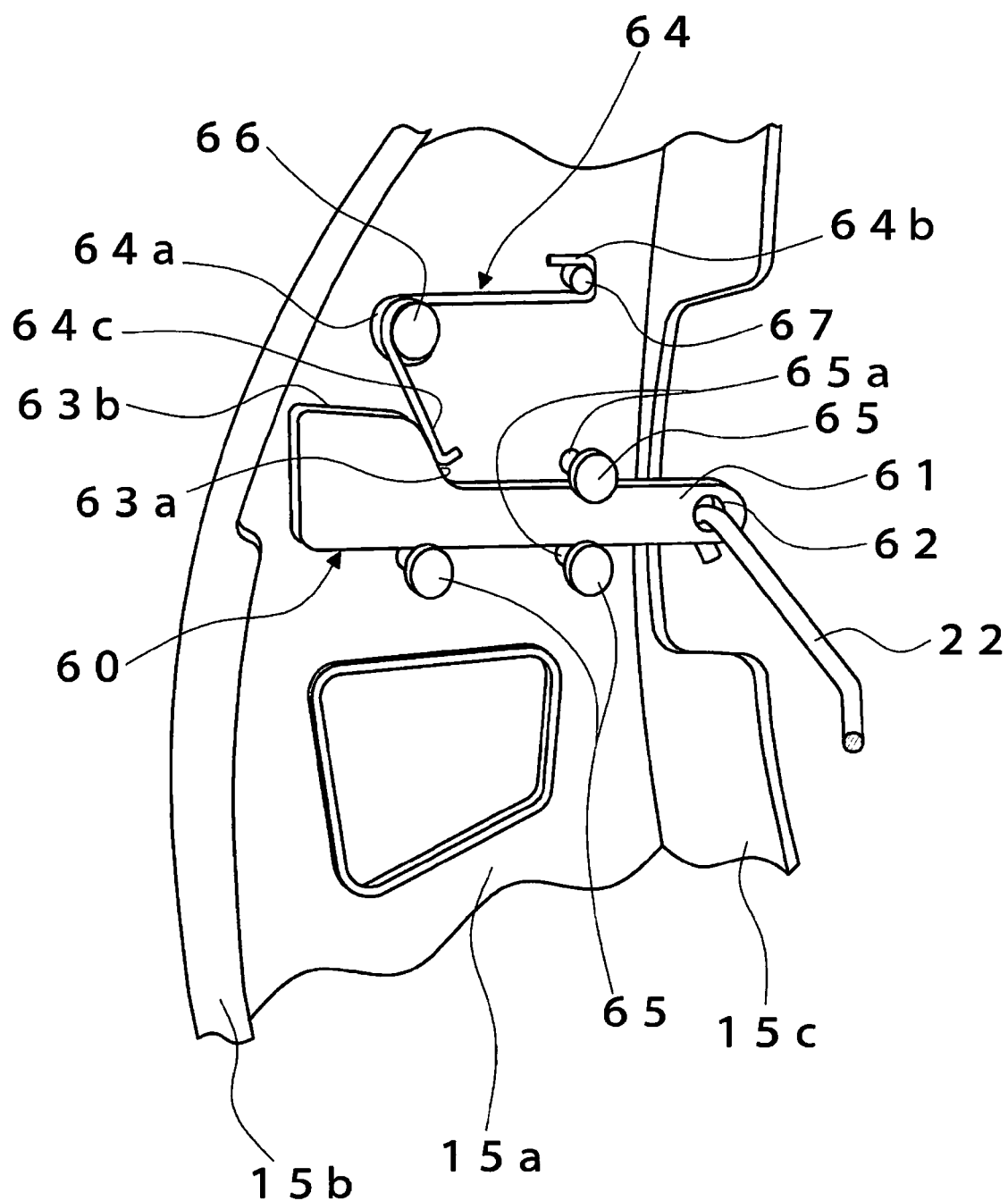
FIG. 11 is an explanation diagram illustrating an impact reduction member and a biasing element according to a second embodiment of the present invention.
Figure 12:
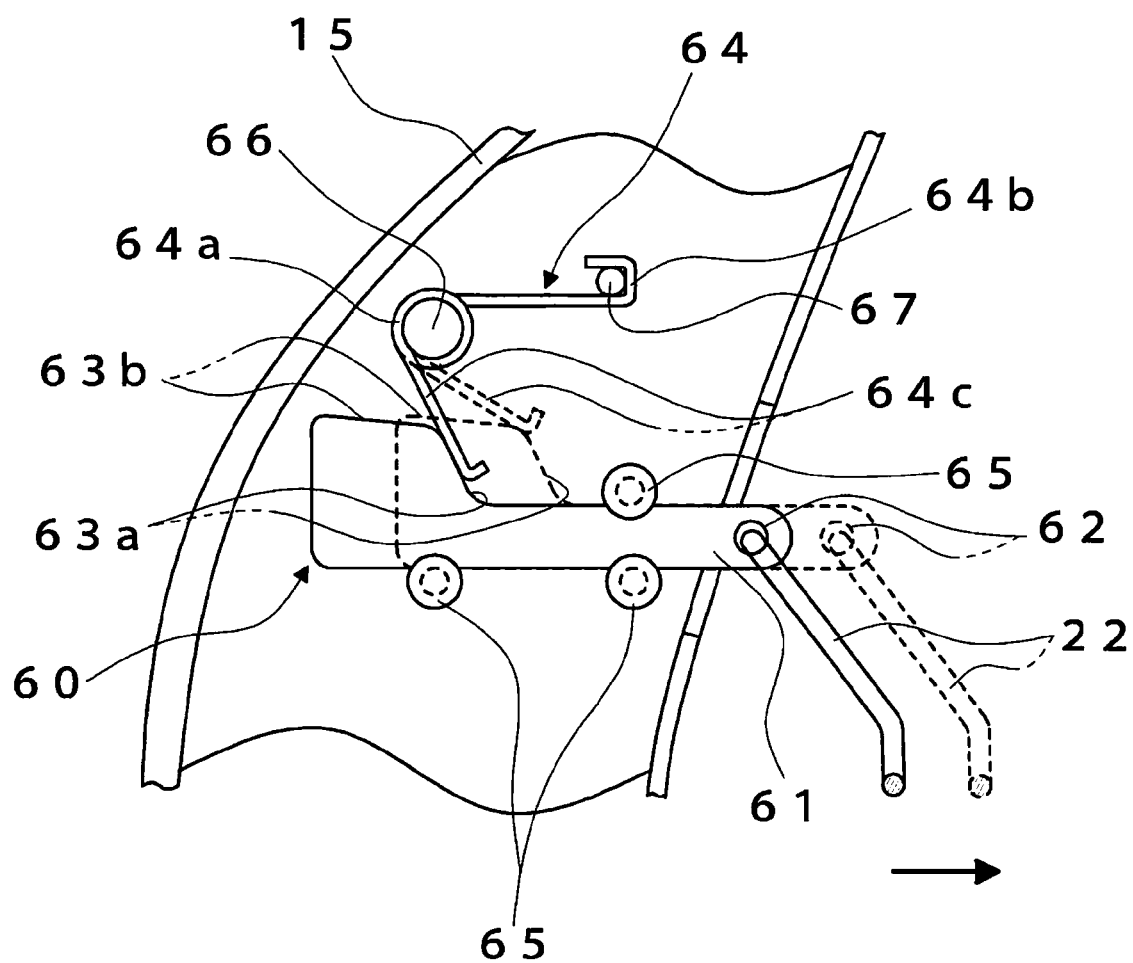
FIG. 12 is a side-view diagram illustrating the states of the impact reduction member and the biasing element before and after a rear-end collision according to the second embodiment.

FIG. 11 and FIG. 12 illustrate a second embodiment. Elements, components, and the like that are the same as those in the first embodiment will be given the same reference numerals in the present embodiment, and descriptions thereof will be omitted.

The present embodiment illustrates an example in which slide members 60 are employed as the impact reduction members disposed on both sides. As shown in FIG. 12, the slide members 60 are configured of sliding portions 61, locking portions 62, and contact portions 63 (63a and 63b); the contact portions 63 comprise first contract portions 63a that make contact with an end of torsion springs 64 serving as biasing elements (mentioned below) and second contact portions 63b, where the first contact portions 63a have a steep slope downward (FIG. 11) and the second contact portions 63b have a gentle slope.

Each torsion spring 64 is formed so that a coil portion 64a is held by a holding pin 66, one end 64b is engaged by a locking pin 67, and the other end 64c makes contact with the corresponding contact portion 63.

Furthermore, multiple guide pins 65 are disposed in the sliding direction, and in positions in the side plates 15a of the side frames 15 that correspond to the upper and lower areas of the sliding portions 61; the guide pins 65 guide the movement of the slide members 60. The guide pins 65 have enlarged head regions and shaft portions 65a, and pullout stopping members (not shown) are disposed so that the guide pins 65 cannot be pulled out.

As shown in FIG. 12, during a normal seating load, the other ends 64c of the torsion springs 64 make contact with the steeply-sloped first contract portions 63a, and thus the slide members 60 have difficulty moving; however, when the wire 22 serving as the coupling member is pulled in the direction of the arrow due to a predetermined impact load exerted on the pressure receiving member 20, the slide members 60 are guided by the guide pins 65 and move against the torsion springs 64 and toward the rear of the vehicle as indicated by the dotted line. At this time, the other ends 64c of the torsion springs 64 move from the steeply-sloped first contract portions 63a to the gently-sloped second contact portions 63b.

The torsion springs 64 and slide members 60 have movement properties in which the force that pushes the slide members 60 of the torsion springs 64 toward the initial position when the gently-sloped second contact portions 63b are in contact is less than the force that pushes the slide members 60 of the torsion springs 64 toward the initial position when the steeply-sloped first contract portions 63a are in contact.

Accordingly, when the slide members 60 start to move due to a rear-end collision, the slide members 60 move without stopping partway, and thus the occupant is caused to reliably sink into the seat back S1.

The impact reduction members according to the aforementioned embodiments (that is, the pivoting members 30 and the slide members 60) have the aforementioned rotational or mobile properties with respect to tension occurring via the wire 22, and therefore in the case where a rear-end collision has occurred, the occupant is caused to sink into the cushion pad 1a of the seat back S1 reliably and with efficiency.

At this time, by sinking into the seat back S1, the back region of the occupant moves backward, but because the position of the headrest S3 does not change relative thereto, the gap between the headrest S3 and the head region of the occupant is reduced; accordingly, the head region is supported by the headrest S3, which has an effect of effectively reducing impacts on the neck region.

Third Embodiment

Figure 13:
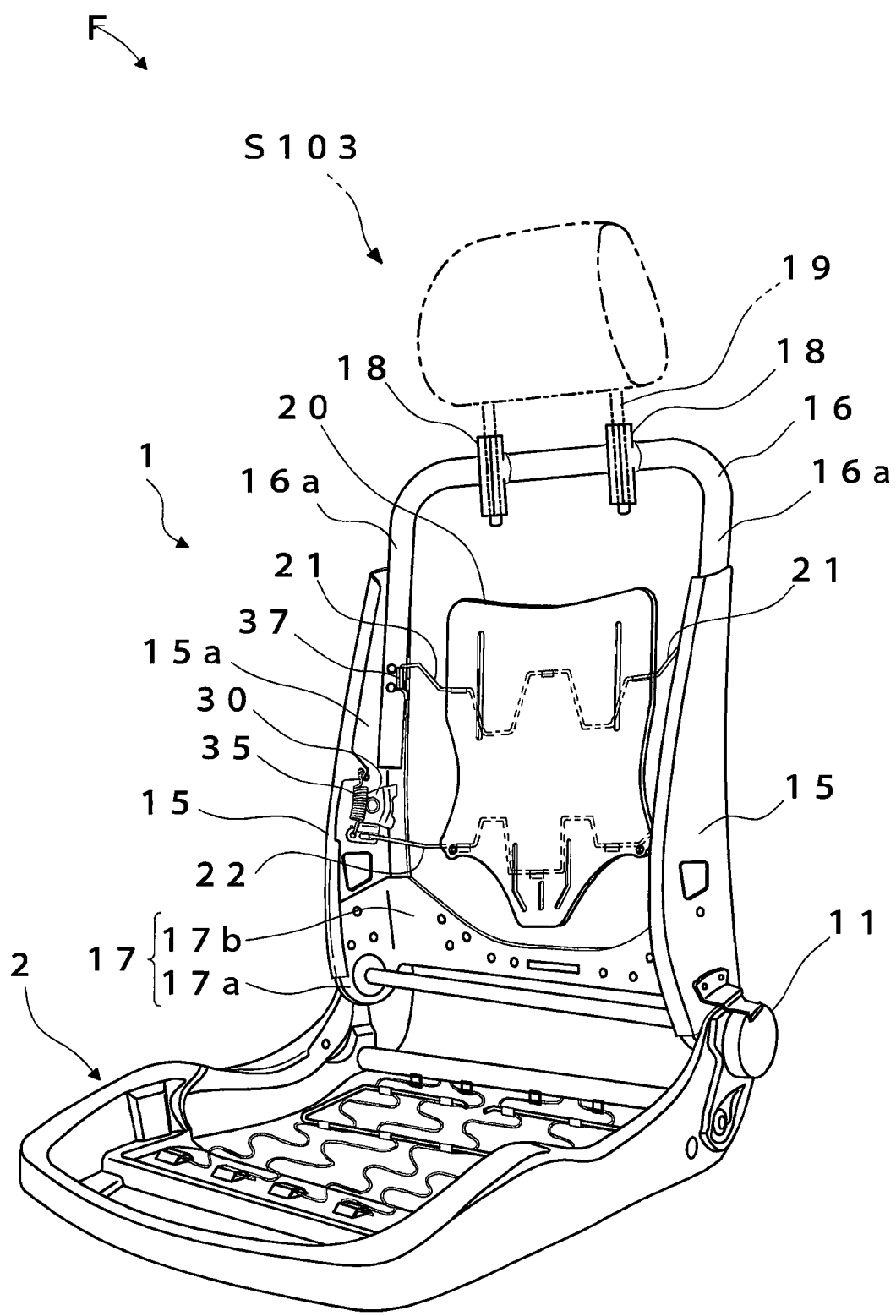
FIG. 13 is an overall perspective view of a seat frame according to a third embodiment of the present invention.
Figure 14:
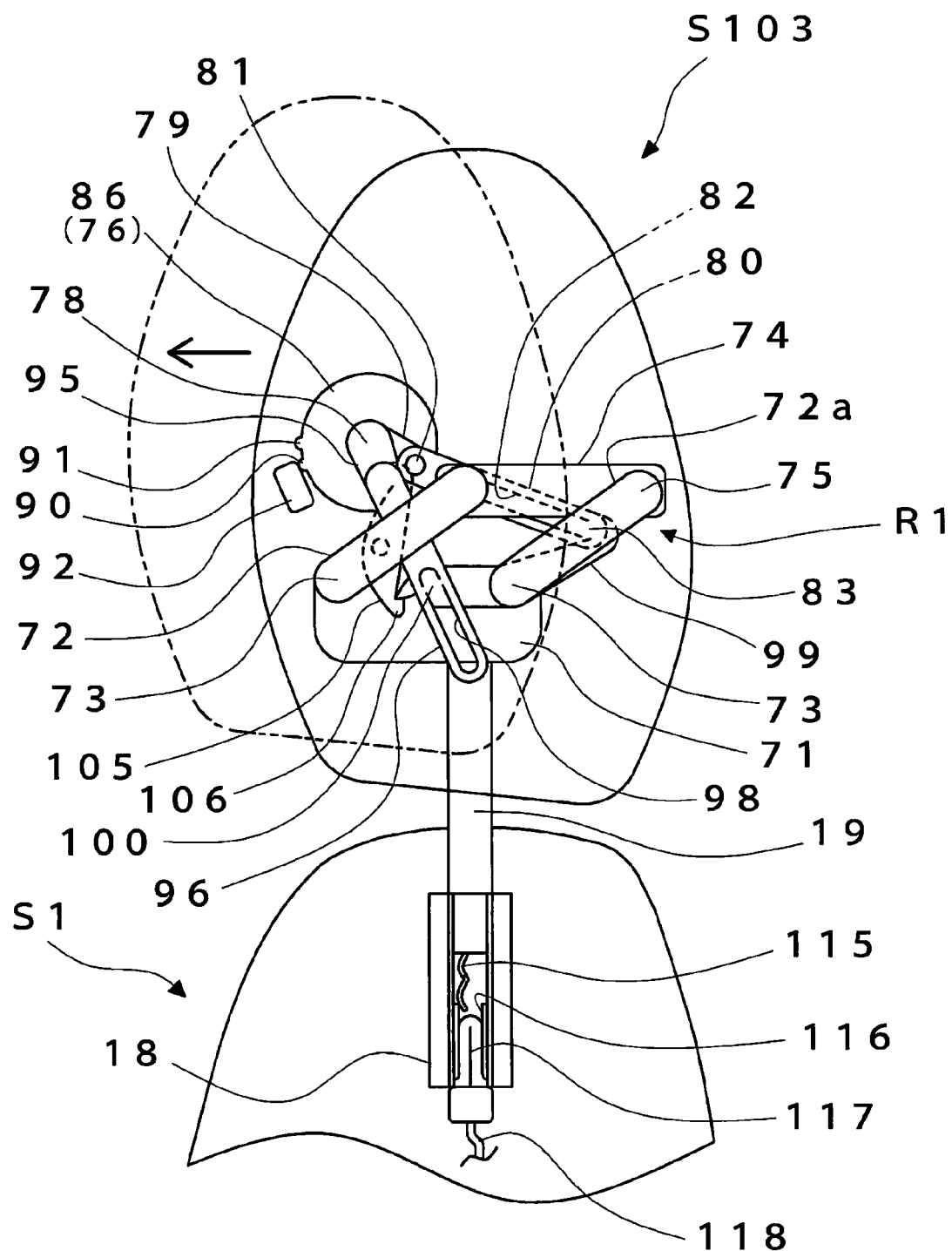
FIG. 14 is a side view of a seat back and a headrest according to the third embodiment.
Figure 15:
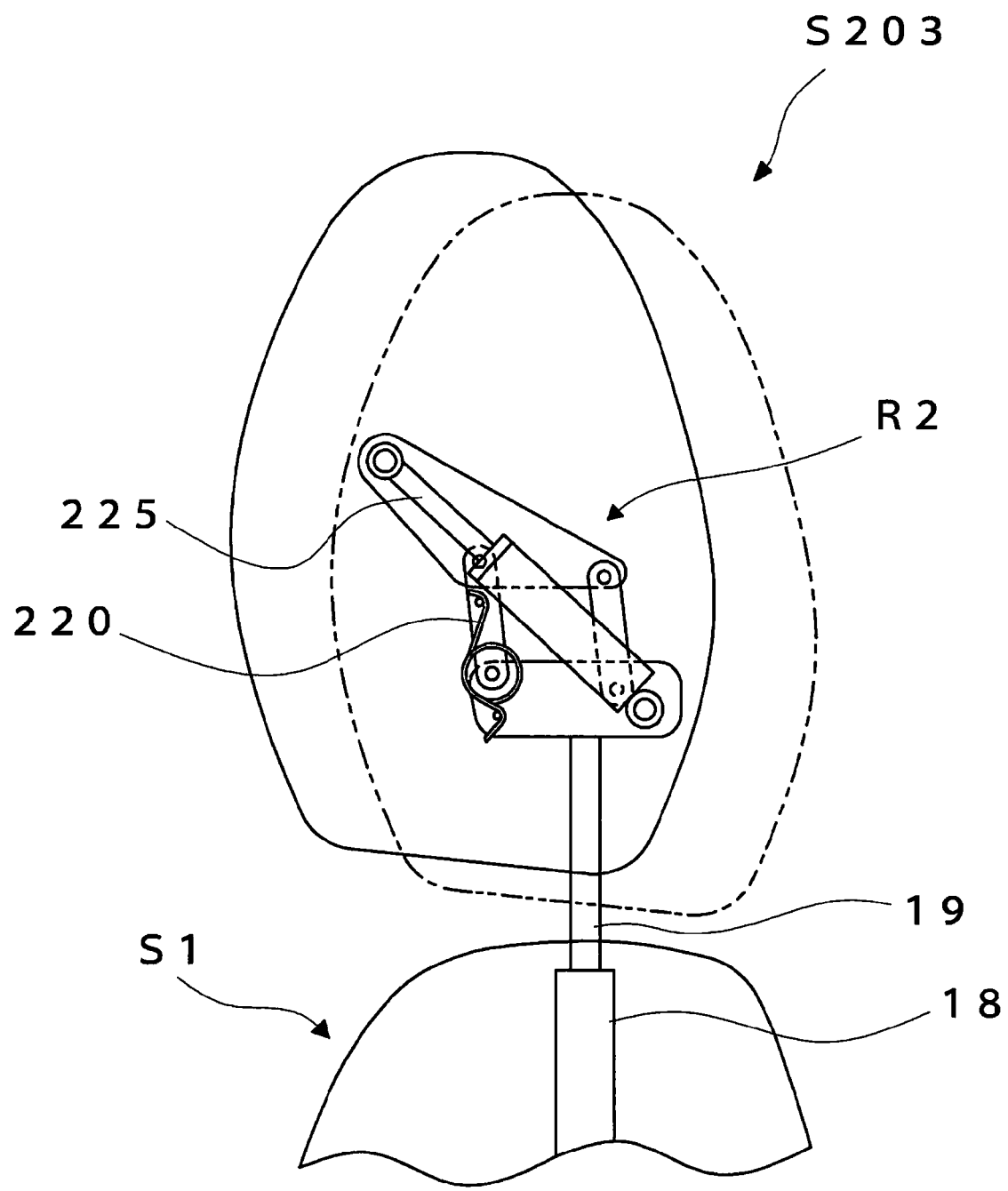
FIG. 15 is a side view illustrating another example of a seat back and a headrest according to the third embodiment.

FIG. 13 through FIG. 15 are diagrams illustrating a third embodiment. Elements, components, and the like that are the same as those in the first embodiment will be given the same reference numerals in the present embodiment, and descriptions thereof will be omitted.

The present embodiment includes a headrest S103 or S203 (an active headrest) serving as a first neck region impact reduction apparatus and the pivoting members 30 (impact reduction member) serving as a second neck region impact reduction apparatus. The first neck region impact reduction apparatus and the second neck region impact reduction apparatus operate independently from each other. Note that the pivoting members 30 serving as the second neck region impact reduction apparatus have the same configuration as the pivoting members 30 of the first embodiment, and thus descriptions thereof will be omitted.

The headrest S103 is provided with a movement mechanism that operates separately from the pivoting members 30 that serve as the impact reduction member, and is an active headrest that reduces impacts on the neck region of an occupant by moving forward when a collision has been predicted or under a predetermined impact load and supporting the head region of the occupant; the headrest S103 serves as the first neck region impact reduction apparatus according to the present embodiment.

The headrest S103 is configured with a padding material (not shown) around its exterior and a skin material (not shown) that covers the exterior of the padding material; for example, the headrest disclosed in Japanese Patent Application Publication No. 2005-177227 and 2005-211402, and the like authored by the present applicant can be employed.

For example, as shown in FIG. 14, according to the technique disclosed in Japanese Patent Application Publication No. 2005-177227, a headrest frame 74 is attached to headrest pillars 19 using a parallel linking mechanism R1 to be freely mobile in the forward and backward directions. The headrest pillars 19 are provided with fixing members 71, and the lower areas of a pair of front and rear link arms 72 are attached in a freely-rotatable state to the fixing members 71 using shafts 73. The upper areas of the link arms 72 are attached to an interlocking member 74 (the headrest frame 74) in a freely-rotatable state using shafts 75.

A motor 76 is attached to the fixing members 71; one end of an output rotation shaft 78 of the motor 76 is attached to a base portion of a position adjustment arm 79, whereas one end of an adjustment rod 80 is attached to the position adjustment arm 79 using a shaft 81. A long hole 82 is formed in the other end of the adjustment rod 80, and a pin 83 of a rear link arm 72a is fitted into the long hole 82.

The motor 76 rotates the position adjustment arm 79 in one of the forward or reverse directions, thus pushing or pulling the pin 83 that is fitted into the leading end of the long hole 82 in the position adjustment arm 79; this in turn causes the pin 83 in the rear link arm 72a to rotate forward or backward central to the shafts 73, and the forward or backward rotation of the pin 83 causes the headrest frame 74 to move forward or backward relative to the headrest pillars 19.

One end of springs (not shown) that continuously bias the link arms 72 to rotate the link arms 72 in the backward direction are locked into the link arms 72, and although not shown in the drawings, the other ends are locked into the fixing members 71.

A rotor 86 is attached to the other end of the output rotation shaft 78 of the motor 76 via a one-way clutch to rotate in one of the forward or reverse directions. Nubs 90 and 91 are provided on the outer circumferential surface of the rotor 86, and a switch 92 is provided in the movement path of the nubs 90 and 91.

The base end of a rear impact operation arm 95 is attached to the other end of the output rotation shaft 78 via a one-way clutch (note that to facilitate understanding, the rear impact operation arm 95 is shown together with the position adjustment arm 79 in the side view diagrams). One end of a rear impact operation rod 96 is attached to the leading end of the rear impact operation arm 95 using a shaft. A long hole 98 is formed in the other end of the rear impact operation rod 96, and a pin 100 provided in one end of a drive link 99 is locked into the long hole 98. The forward and rear intermediate areas of the drive link 99 are attached to the fixing members 71 in a freely-rotatable state using the shafts 73. A rear-side interlocking hook portion is provided in the back end of the drive link 99, and the rear-side interlocking hook portion is disposed to make contact with the pin 83 when the drive link 99 rotates central to the shafts 73.

A front-side interlocking hook is provided in the front end of the drive link 99, making it possible for the drive link 99 to interlock with and release from a lower engagement portion 106 in a lock link 105. The upper and lower intermediate areas of the lock link 105 are attached to the fixing members 71 using shafts, and the configuration is such that an upper hook portion is formed in the upper area of the lock link 105 and the shafts interlock with this upper hook portion.

Furthermore, the configuration is such that a prediction system that predicts a collision from the rear in advance using a radar or the like is provided in a desired position in the vehicle itself, and the motor 76 is electrified based on a collision prediction signal from the prediction system. For example, the configuration is such that a connection terminal 116 is provided in the headrest pillars 19, on one end of a connection cord 115 whose other end is connected to the motor 76, a connection terminal 117 that connects the pillar support portions 18 to the connection terminal 116 is provided, a connection cord 118 is connected to the connection terminal 117, and the motor 76 is electrified from the connection cord 118 via the connection terminal 116 and the connection terminal 117; the electrification of the motor 76 is carried out based on a front and rear adjustment switch (not shown) and the collision prediction signal from the prediction system.

FIG. 15 illustrates a technique disclosed in Japanese Patent Application Publication No. 2005-211402, which illustrates another example of an active headrest; here, a headrest S203 that can freely move forward and backward is provided in the upper portion of the seat back S1 using a link mechanism R2, and the headrest S203 is continuously biased in the forward direction within a forward and backward movement range by a spring 220 and is positioned in the forwardmost position. The spring 220 is configured to have an elasticity that allows the headrest S203 to recede backwards when the head of an occupant makes contact with the headrest S203. The configuration is therefore such that the headrest S203 is continually following the head region of the occupant forward and backward.

Furthermore, a damper 225 is provided in order to reduce resistance at a movement speed occurring when the head region of the occupant makes contact with the headrest S203 and causes the headrest S203 to recede and increase resistance at a movement speed when an impact has occurred and the head region of the occupant moves backward. In this manner, the configuration is such that the backward movement of the headrest S203 is stopped by the damper 225 when an impact has occurred due to a rear impact, thus supporting the head region.

The configuration is also such that the movement of the headrests S103 and S203 (active headrests) serving as the first neck region impact reduction apparatus configured in this manner and the rotation (movement) of the pivoting members 30 (impact reduction member) serving as the second neck region impact reduction apparatus can occur separately and independently. Accordingly, the configuration can be such that the timing when the headrests S103 and S203 begin to operate and the timing when the pivoting members 30 begin to operate are different. For example, in the case where the headrest S103 illustrated in the aforementioned FIG. 14 is employed, the headrest S103 moves forward before a rear-end collision occurs based on the collision prediction signal from the prediction system that predicts collisions in advance, and the pivoting members 30 rotate (move) thereafter due to the predetermined impact load caused by the rear-end collision. In this manner, having different timings in which the respective neck region impact reduction apparatuses begin to operate makes it possible to set the operation starting timings to operation timings that make it easy to suppress a sense of discomfort from being imparted on the occupant; this in turn makes it possible to reduce a sense of discomfort caused by multiple neck region impact reduction apparatuses operating simultaneously.

Furthermore, using the headrest S203 illustrated in the aforementioned FIG. 15, different thresholds are settable for the threshold of the impact load at which the headrest S203 (active headrest) serving as the first neck region impact reduction apparatus operates (in the example of the headrest S203 shown in FIG. 15, the backward movement of the headrest S203 is stopped and thus moves relatively in the forward direction) and the threshold of the impact load at which the pivoting members 30 serving as the second neck region impact reduction apparatus. In this manner, employing different thresholds for impacts at which operation occurs makes it possible to operate only one of the neck region impact reduction apparatuses, such as the pivoting members 30, or operate the multiple neck region impact reduction apparatuses, depending on the size of the predicted impact load, the actual collision load, and the like.

These thresholds can be set to be different based on the state or conditions of the occupant (such as the position, weight, seat height, posture, and the like of the occupant), or can be set to be different based on the state of the seat (the position, the angle of the seat back, and the like).

In the case where the timings at which the apparatuses begin operating are set to be different, the configuration may be such that the threshold of the load at which the pivoting members 30 serving as the second neck region impact reduction apparatus rotate (move) is set to be lower than the threshold of the load at which the headrests S103 and S203 (active headrests) serving as the first neck region impact reduction apparatus operate and the rotation of the pivoting members 30 is carried out before the forward movement of the headrests S103 and S203. By doing so, the pivoting members 30 rotate (move) first when a predetermined impact load has occurred, and thus the body of the occupant can first be caused to sink significantly into the seat, thus bringing the head region of the occupant relatively closer to the headrests S103 and S203; thereafter, the headrests S103 and S203 move and support the head region reliably. Accordingly, the amount of movement of the headrests S103 and S203 is reduced, which makes it possible to move the headrests S103 and S203 into a head region receiving position in a short amount of time. Furthermore, because the amount of movement of the headrests S103 and S203 is reduced, a mechanism or apparatus for moving the headrests S103 and S203 is made more compact, and the weight of the headrests themselves is reduced.

Note that setting the threshold of the load at which the pivoting members 30 serving as the second neck region impact reduction apparatus rotate (move) to be higher than the threshold of the load at which the headrests S103 and S203 (active headrests) serving as the first neck region impact reduction apparatus operate makes it possible to suppress operation of the pivoting members 30 and backward movement of the occupant as a result when a somewhat large load has occurred during normal driving; this in turn makes it possible to support the body of the occupant in a stable manner during normal driving.

In addition, if an apparatus that causes the seat back to tilt under an impact load at the time of a rear-end collision, such as the apparatus disclosed in Japanese Patent Application Publication No. 2008-201215, authored by the present applicant, which operates a rotary damper, serving as a damping linking portion, under an impact load in order to reduce the amount of impact on the body of an occupant by causing the seat back to tilt while absorbing the impact energy, is provided along with the aforementioned multiple neck region impact reduction apparatuses, it is possible to provide a vehicle seat that reduces the impact on the body of an occupant, reduces the impact on the neck region, and thus provides an even higher level of safety.

Although the pivoting members 30 are employed as the second neck region impact reduction apparatus in the present embodiment, the slide members 60 serving as the impact reduction member described in the second embodiment may be employed as the second neck region impact reduction apparatus. The same effects can be achieved in this case as well by causing the thresholds of the loads and the starting timings at which the active headrests serving as the first neck region impact reduction apparatus and the slide members 60 serving as the second neck region impact reduction apparatus to operate differently.

Although the aforementioned embodiments illustrate examples in which the impact reduction member is provided in both of the side frames, the configuration may be such that the impact reduction member is provided only in one of the side frames. In this case, the side frame in which the impact reduction member is not provided can be configured so that the coupling member (the wire) locks directly thereinto.

In addition, according to the aforementioned embodiments, when the occupant sinks into the seat back, because movement of the seat back is not associated with the forward movement of the headrest, there is little loss in the movement energy of the occupant in the rearward direction at the time of a rear-end collision, which makes it possible to cause the occupant to sink more deeply into the seat back.

Although the aforementioned embodiments describe the seat back S1, which is a front seat in an automobile, as a specific example, the present invention is not limited thereto, and the same configurations can of course be applied in the seat backs of the rear seat as well.

TABLE OF REFERENCE CHARACTERS

| | |
|---|---|
| S | vehicle seat |
| S1 | seat back |
| S2 | seat top portion |
| S3, S103, S203 | headrest (neck region impact reduction apparatus) |
| F | seat frame |
| 1 | seat back frame |
| 2 | seating frame |
| 1a, 2a, 3a | cushion pad (padding material) |
| 1b, 2b, 3b | skin material |
| 11 | reclining mechanism |
| 11a | rotation shaft |
| 15 | side frame |
| 15a | side plate |
| 15b | front edge |
| 15c | rear edge |
| 15d | protruding portion |
| 15e | cutout portion |
| 16 | upper frame |
| 16a | side surface portion |
| 17 | lower frame |
| 17a | extension portion |
| 17b | middle portion |
| 18 | pillar support portion |
| 19 | headrest pillar |
| 20 | pressure receiving member |
| 20a | recess portion |
| 21, 22 | wire (coupling member) |
| 21a, 22a | recess and protrusion portion |
| 22c | hook portion |
| 24 | claw portion |
| 30 | pivoting member (impact reduction member) |
| 30a | base portion |
| 30b | first upright portion |
| 30c | formation portion |
| 30d | second upright portion |
| 31 | locking portion |
| 32 | shaft portion |
| 32a | shaft member |
| 32b | shaft hole |
| 32c | hole |
| 32d | matching member |
| 33, 34 | locking hole |
| 35 | extension spring (biasing element) |
| 35a | hook |
| 37 | attachment hook |
| 39 | rotation blocking portion |
| 39a, 39b | stopper portion |
| 40 | wiring hole |

TABLE OF REFERENCE CHARACTERS -continued

| | |
|---|---|
| 50 | airbag apparatus |
| 55 | electrical component unit |
| 60 | slide member (impact reduction member, neck region impact reduction apparatus) |
| 61 | sliding portion |
| 62 | locking portion |
| 63 | contact portion |
| 63a | first contact portion |
| 63b | second contact portion |
| 64 | torsion spring (biasing element) |
| 64a | coil portion |
| 64b | one end |
| 64c | other end |
| 65 | guide pin |
| 65a | shaft portion |
| 66 | holding pin |
| 67 | locking pin |
| 71 | fixing member |
| 72 | link arm |
| 72a | rear link arm |
| 73, 75, 81 | shaft |
| 74 | headrest frame |
| 76 | motor |
| 78 | output rotation shaft |
| 79 | position adjustment arm |
| 80 | adjustment rod |
| 82, 98 | long hole |
| 83, 100 | pin |
| 86 | rotor |
| 90, 91 | projection |
| 92 | switch |
| 95 | rear impact operation arm |
| 96 | rear impact operation rod |
| 99 | drive link |
| 105 | lock link |
| 106 | lower engagement portion |
| 115, 118 | connection cord |
| 116, 117 | connection terminal |
| 220 | spring |
| 225 | damper |
| R1, R2 | (parallel) link mechanism |

The invention claimed is:

1. A vehicle seat comprising:
a seat back frame including at least side portions located on both sides of the seat back frame and an upper portion disposed in an upper area of the seat back frame;
a headrest disposed in the upper area of the seat back frame;
a pressure receiving member that is linked to the seat back frame via a coupling member and that moves independently from the headrest; and
an impact reduction member that is disposed in at least one of the side portions of the seat back frame, is linked to the pressure receiving member, and moves independently from the headrest under a predetermined impact load, wherein:
the impact reduction member is linked to a biasing element that biases the pressure receiving member toward a front of the seat back frame via the coupling member;
a momentum that restores the impact reduction member into an initial state is greatest during normal seating, and covers a range in which the momentum decreases when the impact reduction member rotates due to a rear-end collision;
the impact reduction member includes a shaft that is rotatable; and
a momentum generated by the biasing element that causes the impact reduction member to rotate is greatest during normal seating, and covers a range in which the momentum decreases when the impact reduction member rotates due to the rear-end collision.

2. The vehicle seat according to claim 1, wherein the momentum that restores the impact reduction member into the initial state gradually decreases along with rotation of the impact reduction member.

3. The vehicle seat according to claim 1, wherein the impact reduction member is disposed in both of the side portions in the seat back frame, and both of the impact reduction members rotate independently from each other.

4. The vehicle seat according to claim 1, wherein:
one end of the biasing element is linked to the seat back frame and an other end of the biasing element is linked to the impact reduction member; and
a straight line that connects a position at which the seat back frame and the biasing element are linked with the position at which the impact reduction member and the biasing element are linked approaches the shaft, along with rotation of the impact reduction member due to a pulling force of the coupling member occurring due to a load exerted on the pressure receiving member.

5. The vehicle seat according to claim 1, wherein:
the seat back frame includes a lower portion disposed in a lower area; and
the impact reduction member is disposed within a range enclosed by the seat back frame.

6. The vehicle seat according to claim 1, wherein the impact reduction member is disposed in a range that is below the upper end of the pressure receiving member.

7. The vehicle seat according to claim 1, wherein:
the seat back frame includes a pipe portion that spans across the side portions and the upper portion, and a reclining mechanism having a rotation shaft; and
the impact reduction member is disposed between a lower end of the pipe portion and the rotation shaft of the reclining mechanism.

8. The vehicle seat according to claim 1, wherein the impact reduction member is disposed at a height that is within a range from 50 mm to 270 mm above a hip point.

9. The vehicle seat according to claim 1, wherein a disposal range for an airbag apparatus is formed in the side portions of the seat back frame, and the impact reduction member is disposed between an upper end and a lower end of the disposal range for the airbag apparatus.

10. The vehicle seat according to claim 1, wherein a recess portion is formed in the pressure receiving member in an area that opposes the seat back frame, and the impact reduction member is disposed in a location that opposes the recess portion of the pressure receiving member.

11. The vehicle seat according to claim 1, comprising:
a first neck region impact reduction apparatus and a second neck region impact reduction apparatus movable independently from each other,
wherein:
the first neck region impact reduction apparatus is an active headrest that moves the headrest forward upon prediction of a collision or under the predetermined impact load; and
the second neck region impact reduction apparatus is the impact reduction member that causes the pressure receiving member to sink toward a back of the seat back frame under the predetermined impact load.

12. The vehicle seat according to claim 11, wherein the first neck region impact reduction apparatus and the second neck region impact reduction apparatus have different thresholds for impact loads under which to operate.

13. The vehicle seat according to claim 11, wherein the first neck region impact reduction apparatus and the second neck region impact reduction apparatus are set to have different operation start timings.

14. The vehicle seat according to claim 13, wherein when the predetermined impact load has occurred, the operation of the second neck region impact reduction apparatus is performed before the operation of the first neck region impact reduction apparatus.

15. A vehicle seat comprising:
a seat back frame including at least side portions located on both sides of the seat back frame and an upper portion disposed in an upper area of the seat back frame;
a headrest disposed in the upper area of the seat back frame;
a pressure receiving member that is linked to the seat back frame via a coupling member and that moves independently from the headrest; and
an impact reduction member that is disposed in at least one of the side portions of the seat back frame, is linked to the pressure receiving member, and moves independently from the headrest under a predetermined impact load,
wherein:
the impact reduction member is linked to a biasing element that biases the pressure receiving member toward a front of the seat back frame via the coupling member;
a force that restores the impact reduction member into an initial state is greatest during normal seating, and covers a range in which the force decreases when the impact reduction member moves due to a rear-end collision;
the force that restores the impact reduction member into the initial state gradually decreases along with movement of the impact reduction member.

16. The vehicle seat according to claim 15, wherein:
one end of the biasing element is linked to the seat back frame and an other end of the biasing element is linked to the impact reduction member; and
a straight line that connects a position at which the seat back frame and the biasing element are linked with the position at which the impact reduction member and the biasing element are linked approaches the shaft, along with movement of the impact reduction member due to a pulling force of the coupling member occurring due to a load exerted on the pressure receiving member.

17. A vehicle seat comprising:
a seat back frame including at least side portions located on both sides of the seat back frame and an upper portion disposed in an upper area of the seat back frame;
a headrest disposed in the upper area of the seat back frame;
a pressure receiving member that is linked to the seat back frame via a coupling member and that moves independently from the headrest; and
an impact reduction member that is disposed in at least one of the side portions of the seat back frame, is linked to the pressure receiving member, and moves independently from the headrest under a predetermined impact load; and
a first neck region impact reduction apparatus and a second neck region impact reduction apparatus movable independently from each other,
wherein:
the impact reduction member is linked to a biasing element that biases the pressure receiving member toward a front of the seat back frame via the coupling member;
a force that restores the impact reduction member into an initial state is greatest during normal seating, and covers a range in which the force decreases when the impact reduction member force due to a rear-end collision;

the first neck region impact reduction apparatus is an active headrest that moves the headrest forward upon prediction of a collision or under the predetermined impact load; and the second neck region impact reduction apparatus is the impact reduction member that causes the pressure receiving member to sink toward a back of the seat back frame under the predetermined impact load.

18. The vehicle seat according to claim 17, wherein the first neck region impact reduction apparatus and the second neck region impact reduction apparatus have different thresholds for impact loads under which to operate.

19. The vehicle seat according to claim 17, wherein the first neck region impact reduction apparatus and the second neck region impact reduction apparatus are set to have different operation start timings.

20. The vehicle seat according to claim 19, wherein when the predetermined impact load has occurred, the operation of the second neck region impact reduction apparatus is performed before the operation of the first neck region impact reduction apparatus.

* * * * *